US 8,057,746 B2

(12) United States Patent
Matsuoka

(10) Patent No.: US 8,057,746 B2
(45) Date of Patent: Nov. 15, 2011

(54) CARRIER FOR EXHAUST-GAS PURIFICATION AND EXHAUST-GAS PURIFIER HAVING THE CARRIER

(75) Inventor: Hiroshi Matsuoka, Kanagawa-ken (JP)

(73) Assignee: ACR Co., Ltd., Kanagawa-Ken (JP)

( * ) Notice: Subject to any disclaimer, the term of this patent is extended or adjusted under 35 U.S.C. 154(b) by 799 days.

(21) Appl. No.: 12/113,771

(22) Filed: May 1, 2008

(65) Prior Publication Data
US 2008/0274020 A1 Nov. 6, 2008

(30) Foreign Application Priority Data

| May 2, 2007 | (JP) | 2007-121435 |
| May 18, 2007 | (JP) | 2007-132545 |
| Jan. 7, 2008 | (JP) | 2008-000418 |
| Jan. 7, 2008 | (JP) | 2008-000467 |

(51) Int. Cl.
B01D 50/00 (2006.01)
F01N 3/10 (2006.01)

(52) U.S. Cl. ........ 422/171; 422/174; 422/177; 422/180; 55/482; 55/486; 55/520; 55/523; 60/297; 60/300

(58) Field of Classification Search .......... 422/171, 422/174, 177, 179, 180; 55/482, 486, 520, 55/521, 523, 524; 60/297, 300
See application file for complete search history.

(56) References Cited

U.S. PATENT DOCUMENTS

| 4,381,590 A | | 5/1983 | Nonnenmann et al. | |
| 5,611,831 A | * | 3/1997 | Matsuoka et al. | 55/486 |
| 5,820,833 A | * | 10/1998 | Kawamura | 422/174 |
| 5,908,480 A | * | 6/1999 | Ban et al. | 55/482 |
| 6,534,021 B1 | * | 3/2003 | Maus | 422/180 |
| 6,582,490 B2 | * | 6/2003 | Miller et al. | 55/520 |
| 7,340,888 B2 | * | 3/2008 | Zhang et al. | 60/297 |
| 7,563,414 B2 | * | 7/2009 | Bruck | 422/180 |

FOREIGN PATENT DOCUMENTS

| CA | 1144344 | | 4/1983 |
| DE | 29 27 815 | A1 | 1/1980 |
| DE | 29 24 592 | A1 | 1/1981 |
| DE | 42 06 812 | A1 | 9/1992 |
| DE | 197 04 147 | A1 | 8/1998 |
| EP | 0 298 943 | A2 | 1/1989 |
| EP | 0 639 398 | A1 | 2/1995 |
| EP | 0 798 452 | A1 | 10/1997 |

(Continued)

OTHER PUBLICATIONS

European Search Report dated Oct. 9, 2008.

(Continued)

Primary Examiner — Nina Bhat
(74) Attorney, Agent, or Firm — Browdy and Neimark, PLLC

(57) ABSTRACT

A carrier for exhaust-gas purification is able to effectively protect against getting clogged with the particulate matters in a filter having carriers. The carrier is constituted with a web corrugated to have straight and/or zigzag ridges and then wound up into a column. The carrier for exhaust-gas purification is made of the web of wire netting or nonwoven metallic fabric, which is embossed to have ridges and grooves extending at least in a widthwise direction and further wound up spirally or stacked on top of the other into the column.

46 Claims, 16 Drawing Sheets

FOREIGN PATENT DOCUMENTS

| | | |
|---|---|---|
| GB | 1 485 042 | 9/1977 |
| JP | 59-73053 A | 4/1984 |
| JP | 1-123638 | 5/1989 |
| JP | 6-2536 | 1/1994 |
| JP | 8-196918 | 8/1996 |
| JP | 819618 | 8/1996 |
| JP | 10-159552 | 6/1998 |
| JP | 2003-509620 | 3/2003 |
| JP | 2005-534487 | 11/2005 |
| JP | 2006-002713 | 1/2006 |
| JP | 2006-015181 | 1/2006 |
| JP | 2007-224884 | 9/2007 |
| WO | 01/20142 A1 | 3/2001 |
| WO | 01/66300 A1 | 9/2001 |
| WO | 01/92692 A1 | 12/2001 |
| WO | 2004/015251 A1 | 2/2004 |
| WO | 2004/092553 A1 | 10/2004 |

OTHER PUBLICATIONS

Bollig et al "Next generation catalysts are turbulent: development of support and coating" Paper Offer 04FL-108, Society of Automotive Engineers, Inc. (BMW Group, Engelhard Technologies GmbH and Emitec GmbH) pp. 1-8 (2004).

\* cited by examiner

CARRIER FOR EXHAUST-GAS PURIFICATION AND EXHAUST-GAS PURIFIER HAVING THE CARRIER

FIELD OF THE INVENTION

The present invention relates to a carrier construction befitted for an exhaust gas-control system in which as exhaust gases flow while coming into contact with the carrier construction, harmful materials entrained in the exhaust gases burn up, experience oxidation-reduction reaction, or redox reaction, to get disappeared, and further an exhaust-gas purifier having the same therein.

BACKGROUND OF THE INVENTION

There are conventionally known diesel engine emission-control systems in which catalytic materials including oxidizing catalysts and nitrogen oxides (NOx) reducing catalysts are coated or deposited on a cordierite honeycomb carrier to convert harmful pollutants including hydrocarbons (HC), carbon monoxides (CO), soluble organic fraction (SOF) in particulate matters (PM), nitrogen oxides (NOx), and so on in the exhaust gases into harmless materials. With the conventional catalytic emissions-control systems constructed as stated earlier, the exhaust gases are allowed passing over a large surface areas inside the honeycomb carrier in a manner reversed in flow directions by alternate closing of any one of forward and aft ends of gas passages in the honeycomb carrier to get the particulate matters trapped to purify the exhaust gases. There are two types of the honeycomb carrier, one of which is made to close alternately either of the forward and aft ends of the gas passages inside the honeycomb to trap only the particulate matters contained in the exhaust gases while the other is constructed the gas passages inside the honeycomb remain open to get the exhaust gases flowing in steady direction to exclude harmful materials from the exhaust gases.

Moreover, the diesel engines are recognized once again in recent years for the source of power because their less carbon dioxides (CO2) emission and find increased applications in a diversity of passenger vehicles. Most diesel engines for automobiles recently have diesel-particulate filters (DPF) in which particulate matters trapped inside the ceramic honeycomb are catalyzed at relatively low temperature to get burned off to accomplish the purification of the exhaust gases. As most components of particulate matters contained in the automobile exhaust emissions are unburned carbons or hydrocarbons originated in heavy oil, it will be easily considered complete combustion of fuel through with the DPF helps expel all particulate matters. The catalysts commonly carried on the filters, as heated up to around 300° C., starts to get soot burning or nitrogen monoxides (NO) reducing into nitrogen dioxides (NO2), which is in turn utilized.

With the ceramic honeycombs, especially constructed to remain open at their forward and aft ends as stated earlier, much effort is made to reduce cellular walls of honeycomb in thickness to increase cell density (number of cell per square inch) in the honeycomb. The carrier of honeycomb in practical use in this point has cells of from 200 to 400. In contrast to the ceramic honeycomb as stated earlier, other carrier of metallic honeycomb is in practical use for the catalytic exhaust emission purification. The metallic honeycomb has the construction that corrugated thin sheets and flat sheets stacked alternately on top of each other are wound up together in spiral geometry. Conventional practice in metallic honeycomb constructed as stated earlier is to make the sheets as thin as possible in thickness with keeping mechanical strength to increase number of cells in the honeycomb thereby making sure of large surface areas coming into contact with the exhaust gases.

Meanwhile, it is inevitable to purify the exhaust gases emitted from not only new cars but used cars to keep urban atmosphere clean. Addition of the DPF to the used cars is positively encouraged according to the aspect stated just above. Nevertheless, the diesel-particulate filter added to the currently existing automobiles, because of uncontrollable in unification or association with the engines, often fails to work in good performance.

What is made of composite materials of metallic sheets with metallic nonwoven layers starts recently finding applications in filters for exhaust-gas purification. With the filters constructed as stated earlier, the metallic sheets serve introducing the exhaust gases to come into collision against the metallic nonwoven layers to trap the gasborne particulate matters. These filters are sophisticated in construction and further have a major drawback the decreasing rate of PM is from 40 to 50% at the most and can't be raised any further. Although increase of surface areas to come into contact with the exhaust gases is also beneficial for the metallic honeycombs, there is further proposed the metallic honeycomb that is designed to cause any turbulent flow in the exhaust gases flowing through gas passages defined inside cells in the honeycomb to encourage more contact of the exhaust gases with the catalysts. One example of the metallic honeycombs is disclosed in "Next generation catalysts are turbulent: Development of Support and Coating: opened to public on 2004-01-1488, refer to Internet Google. With the metallic honeycomb recited earlier, the metallic plates thin in thickness are perforated. The perforations made in the metallic plates, though costly to the increase of large surface areas, contribute to generation of turbulent flow inside the gas passages to encourage more contact of the exhaust gases with the catalysts.

In Japanese Laid-Open Application H08-196 918, there is disclosed a catalyst carrier for exhaust-gas purifier in which a thin web of catalyst carrier is received while wound into multiple carrier winds inside a cylindrical casing that remains open at both axial opposite ends thereof. The catalyst carrier fitted inside the casing has turbulent generators, which are made with perforations or deformed surface areas to disturb the flow of exhaust gases. The catalyst carrier is held inside the casing with retainers to keep the catalyst carrier against falling away out of the casing. Thus, the turbulent flow of the exhaust gases inside the cylindrical casing is encouraged to react with catalysts over much time to improve purification efficiency.

Another catalyst carrier for exhaust-gas purification is disclosed in Japanese Laid-Open Application H06-2 536, which has a cylindrical casing, upstream first honeycomb and a downstream second, the first honeycomb being carried on a support member extending axially upstream side beyond the second honeycomb in a way isolated away from the casing.

A metallic carrier for exhaust-gas purification to carry thereon catalysts to purify exhaust emissions including automobile emissions, and so on is disclosed in Japanese Laid-Open Application H01-123 638, in which there is provided a honeycomb construction made of metallic even sheets and corrugated sheets laid alternately on top of each other in the shape of either spiral or laminate, the honeycomb being separated into upstream and downstream sections with respect to the exhaust-gas flow. The honeycomb sections are arranged in series in a way their even sheets overlap one another along their confronting edges so as to get their corrugations somewhat staggered each other. A canister fits over the honeycomb to cover around the outside surface of the honeycomb in a way extending in the direction of internal pore surface areas in the honeycomb. Moreover, radial plates are secured to the axially opposite ends of the canister to keep the honeycomb inside the canister.

Another exhaust-gas purifier is disclosed in Japanese Laid-Open Application H10-159 552, which is envisaged decrease or exclusion of soot particles entrained in the exhaust gases emitted out of the diesel engines. The exhaust-gas purifier includes a first catalytic material for oxidizing NO to NO2, and second catalytic material for oxidization of hydrocarbons, carbon monoxides and volatile organic components. The soot particles trapped on or in the monolith coated with the second catalytic material are burned off with gases containing NO2 coming from the first catalytic material. The monolith for the first catalytic material is designed to keep capture of soot particles to a minimum.

A filter to purify the exhaust emissions coming from the diesel engines is disclosed in International Publication WO2004/015 251, which is composed of gold foil and a web of filtering medium made of a substance allowing fluids to pass in part through there. The filtering medium includes active catalyst coatings to convert gaseous components contained in the exhaust gases and filtering areas to separate and remove particles from the exhaust gases.

A further another exhaust-gas purifier with heating elements is disclosed in International Publication WO01/020, 142, which has an outside enclosure to accommodate therein a honeycomb of catalyst carrier allowing exhaust gases to flow through there, and an electric heating element having electric connecting terminals at opposite ends and containing therein clearances for electric insulation to define serpentine flow passages. The honeycomb for the heating element is held in the catalyst carrier by means of electrically insulated carrying elements. The honeycomb for the heating element is placed downstream in respect of the flowing direction of the exhaust gases.

In diesel engines, meanwhile, as there is universally trade-off relation between NOx and PM, it is very tough to decrease them alike. Moreover, the diesel engines, because of rich in oxygen concentration in the exhaust gases, are difficult to reduce the NOx by means of the three-way catalytic converters, which are proved effective in most automotive gasoline engines. Further, soot mainly occupied by PM, because of high in oxidation temperature, needs any means designed specially for decrease thereof. With the existing DPF having filters coated with catalysts, the catalysts of platinum and so on to spare are universally carried on the filters in advance to cope with degradation of the catalysts so as to ensure safely their performance. Nevertheless, even the DPF engineered with the degradation of catalysts in mind as stated earlier might be insufficient for cars running very long distances and help little in keep the intrinsic performance to exclude the PM out of the exhaust gases.

The PM-based soot burns off after trapped in the filters. However, when the cars having mounted with the DPF are forced to drive continuously at slow velocity over time in for example traffic jams, chances the temperature of exhaust gases emitted from the engines reaches burning temperature might be too few in frequency. As a result, the filters are clogged up with much soot to choke the exhaust manifold. Thus, there is possibility that the cars couldn't run any further. In contrast, when the exhaust temperature rises above the combustion temperature of much soot deposits on the filters depending on any changes in driving condition, the PM would burst abruptly to cause filter damages or meltdown and, in some instances, blazes. To cope with this, the advanced DPF is added with a pressure sensor or the like to monitor the amount of soot deposits over the filters, and any means to raise the exhaust temperature to promote combustion of the soot after the amount of soot deposits has been beyond a preselected level.

Among systems to elevate the exhaust temperature in the engines with exhaust-gas purifier are known the system in which a common-rail injection system atomizes the fuel in the combustion chamber during either a latter portion of the expansion phase or the exhaust phase to raise the exhaust temperature, another system in which the an injected fuel is subjected to exothermic oxidation in oxidizing catalysts installed backward, and a further another system in which a different fuel delivery line is provided upstream the PM excluder to feed the fuel into the oxidizing catalysts installed backward to encourage exothermic oxidation to raise the exhaust temperature. With the PM purifiers advanced as stated earlier, there is far less risk than ever of the possibility the filters might be clogged with much soot. Nevertheless, the system to elevate the exhaust temperature with no avail fuel consumption, as activated every time when the exhaust temperature falls short of the burning temperature of the PM at low velocities, has the shortcoming of getting the fuel efficiency worse. With the PM catalysts low in activated temperature, especially, the more the system to elevate the exhaust gases works in frequency, the worse the fuel efficiency is.

SUMMARY OF THE INVENTION

In view of the above problems associated with the related art, the present invention has as its principal object the provision of a novel carrier for exhaust-gas purification befitted to adopt it in the exhaust-gas purifiers and an exhaust-gas purifier having incorporated the carrier therein. More particular, a primary object of the present invention is to provide a novel carrier of honeycomb in which channels through which the exhaust gases are passed are made completely different in construction from the prior art in order to bring out performances in exhaust-gas purification beyond the natural limits ever known of the carrier construction of honeycomb made of thin sheets. Webs of metallic wire netting or metallic non-woven fabric are wound up or stacked on top of each other into layered winds of a cylindrical column including right circular cylinder, regular prism in a way making straight or zigzag channels between any two adjoining webs. The exhaust gases passing through the channels are so little permitted to move across the web, but forced dominantly along channels with coming into contact with channel walls. The straight or zigzag channels between the webs function not only to cause turbulent flows in streams of the exhaust gases, but also to provide extremely large surface areas coming into contact with the exhaust gases, promoting the redox reaction of harmful materials with catalysts deposited on the web surfaces to get the harmful materials disappeared. Particulate matters are ensured to continue flowing smoothly through the channels while colliding with the channel walls without giving rise to clogging or choking as ever found in the cells in the prior honeycomb. The harmful materials including particulate matters or the like are trapped on the web surfaces along the exhaust-gas channels, for example caught or stagnated around bent areas in the channels, and then either burned off with exhaust heat coming from the raised exhaust gases emitted out of the engines or subjected to the redox reaction with the aid of catalysts. The redox reaction as stated earlier converts around from 70 to 99% of the harmful materials in the exhaust gases into harmless materials, thereby ensuring cutting back the particulate matters by as much as about from 40 to 80%.

The present invention is concerned with a carrier construction for exhaust-gas purification comprised of a carrier coated with a catalyst to get harmful materials including particulate matters and soot disappeared with burning or oxidizing-reducing reaction to purify the exhaust gas, and a canister that fits over the carrier;

wherein the carrier is constituted with a laminate web of a wire netting or a metallic nonwoven fabric wound up into a cylindrical column or stacked on top of the other into a column, the laminate web including at least a sheet of corrugated web having ridges extending parallel with an axis of the column or obliquely to the axis of the column and grooves between successive ridges to make channels through which the exhaust gas is passed from any one side to other side of the column with accompanying turbulent flow caused by a crimped surface of the web.

In one aspect of the present invention, a carrier construction for exhaust-gas purification is disclosed, in which the laminate web is composed of the corrugated web overlapped on top of the other, or the corrugated web and a flat web overlapped alternately each other. In another aspect of the present invention, there is disclosed a carrier construction in which the ridges on the corrugated web extend zigzag with respect to the axis of the column to make zigzag channels through which the exhaust gas is passed. In another aspect of the present invention, there is disclosed a carrier construction in which the corrugated webs are overlapped on top of the other in geometry the channels defined with the ridges are staggered or crossed with each other. As an alternative, there is disclosed a carrier construction in which the ridge embossed on the web is made in geometry that a length oblique with respect to the axis of the column and another length parallel with the axis of the column alternate each other so that the exhaust-gas channel defined along the groove on the corrugated web is made up of a parallel channel and a zigzag channel.

In a further another aspect of the present invention, there is disclosed a carrier construction for exhaust-gas purification in which the carrier is composed of a set of the corrugated web and the flat web or a set of more than two sheets of the corrugated webs whose ridges are identically or differently oblique to the axis of the column, the webs being wound up together into a cylindrical column or stacked on top of the other into the column.

In another aspect of the present invention, a carrier construction for exhaust-gas purification is disclosed in which a wire netting or a metallic nonwoven fabric for the laminate web is constituted with wires of iron-aluminum-chromium alloy or stainless steel. Moreover, there is disclosed a carrier construction in which the laminate webs overlapped on top of the other are joined together with brazing material or brazing foil. As an alternative, a carrier construction is disclosed in which the carrier is brazed at any one of axially opposite ends thereof with joints of the brazing material, which are made to extend radially in the form of intermittent lines with a preselected width, or made gradually thicker in their widths as they are splayed radially outward in another aspect of the present invention, a carrier construction for exhaust-gas purification is disclosed in which the brazing material or brazing foil is applied to braze at least the ridges of the corrugated web with local areas of the web expected to come into brazed coalescence with the ridges, thereby getting the adjacent webs brazed together at the time the corrugated web is wound up into the column. Further, there is disclosed a carrier construction in which locations of the local areas expected to make brazed coalescence between the adjacent webs are staggered from one another every web when view in axial direction of the column.

In another aspect of the present invention, a carrier construction for exhaust-gas purification is disclosed in which the ridges on the corrugated web are embossed obliquely to have a series of angles across angular range of 10°~50° with respect to the axis of the column to form the zigzag channels through which the exhaust gas is passed. As an alternative, the carrier construction is disclosed in which the corrugated web is embossed to have more than two groups of the zigzag ridges, each group of which is different from the other in oblique angles across angular range of 0°~50° to the axis of the column. In a further another aspect of the present invention, there is disclosed a carrier construction for exhaust-gas purification in which more than one column fits into the cylindrical canister in a way that oblique angles of the ridges embossed on the corrugated webs of the columns are made either identical or different between the upstream side and downstream side of the exhaust gas. Moreover, there is disclosed a carrier construction in which a wire for the wire-netting is 0.03 mm~0.35 mm in diameter.

In another aspect of the present invention, there is disclosed a carrier construction for exhaust-gas purification in which the wire netting has a mesh pattern of 16~200 meshes. More in detail, the carrier construction is disclosed in which number of mesh in the wire netting differs between a warp and a weft in such a relation that the mesh in the warp is greater than in the weft and the number of mesh in the wire netting is 30~100 meshes in the warp while 60~200 meshes in the weft.

In another aspect of the present invention, a carrier construction for exhaust-gas purification is disclosed in which a pitch between successive ridges is at a range from 1 mm to 6 mm. Moreover, there is disclosed a carrier construction in which a difference between a bottom of the groove and a crest of the ridge is at a range from 0.5 mm to 5 mm.

In another aspect of the present invention, a carrier construction for exhaust-gas purification is disclosed in which the wire woven into the web to make the carrier is coated with at least more than one ceramic material selected from alumina, silica, zirconia, and seria. Moreover, there is disclosed a carrier construction in which the surface of the ceramic coating layer has carried with at least more than one reduction-oxidation catalyst selected from platinum, silver, potassium, palladium, iridium, iron, copper, and barium.

In another aspect of the present invention, a carrier construction for exhaust-gas purification is disclosed in which while the exhaust gas passes through the channels defined between the adjacent webs along the grooves, the harmful materials gasborne in the exhaust gas flows with accompanying turbulent flow to continue coming into contact with the web, and in doing so experience oxidation-reduction reaction with the aid of the catalyst to get disappeared. In a further another aspect of the present invention, there is disclosed a carrier construction for exhaust-gas purification in which the catalyst coated over the carrier is any of three-way catalyst, oxidizing catalyst and NOx-reducing catalyst that uses a reducing agent selected from fuel of hydrocarbons, ammonia, or urea.

The present invention, moreover, is concerned with an exhaust-gas purifier comprising; a filter installed inside an exhaust passage to allow an exhaust gas passing through across the filter to get harmful materials including particulate matters, soot, NOx, HO, and so on disappeared with combustion or reducing-oxidizing reaction; wherein the filter is constituted with a carrier of a laminate web of wire netting or metallic nonwoven fabric, which is wound up cylindrically or stacked on top of the other into a column, the laminate web being composed of a corrugated web having a ridge extending straight parallel or obliquely to an axis of the column and a groove between any adjacent ridges to make a channel though which the exhaust gas is passed between any overlapped webs in a way extending from any one end of axially opposite ends to the other end of the column; and wherein while the exhaust gas passes through the channel with coming into contact with crimped surface of the wire netting or metallic nonwoven fabric, the harmful materials gasborne in the exhaust gas flow with accompanying turbulent flow, and in doing so are trapped on the web and/or allowed to pass across the web, experiencing combustion and/or oxidation-reduction reaction to get disappeared.

In one aspect of the present invention, there is disclosed an exhaust-gas purifier having incorporated with the carrier for purification of exhaust gas constructed as stated earlier.

In another aspect of the present invention, there is disclosed an exhaust-gas purifier in which the laminate web is depressed below the web surface or elevated above the web surface in widthwise direction, and once the laminate web is wound up or stacked on top of the other into the column, depressions or elevations on the laminate web fit into each other in interlocked relation to keep the laminate web against getting off each other in a flowing direction of the exhaust gas along the axial direction of the column.

In another aspect of the present invention, an exhaust-gas purifier is disclosed in which the filter is composed of a set of the corrugated web and the flat web or a set of more than two sheets of the corrugated webs whose ridges are identically or differently oblique to the axis of the column, the webs being wound up together into a cylindrical column or stacked on top of the other into the column. Moreover, there is disclosed an exhaust-gas purifier in which the filter is brazed at any one of axially opposite ends thereof with joints of the brazing material, which are made to extend radially in the form of intermittent lines with a preselected width, or made gradually thicker in their widths as they are splayed radially outward.

In a further another aspect of the present invention, an exhaust-gas purifier is disclosed in which the filter is made up of more than one column arranged in series in the flowing direction of the exhaust gas. Moreover, there is disclosed an exhaust-gas purifier in which oblique angles of the ridges embossed on the corrugated web are made smaller in an upstream side than in a downstream side of the exhaust gas. In another aspect of the present invention, an exhaust-gas purifier is disclosed in which the filter is made of the corrugated web made of at least three sheets of wire netting laminated with each other in a relation that inward wire netting is made fine in mesh while outward wire nettings are coarse in mesh.

In another aspect of the present invention, an exhaust-gas purifier is disclosed in which the filter is made of the corrugated web of at least three sheets of wire netting laminated with each other in a relation that inward wire netting is made fine in mesh with a wire thick in diameter while outward wire nettings are coarse in mesh and thin in wire diameter.

In another aspect of the present invention, there is disclosed an exhaust-gas purifier in which the filter is constituted with corrugated webs different in pitch between successive ridges and alternately overlapped on top of the other, and wherein the pitch in one of different webs is made larger at the upstream side of the gas flow than at the downstream side, and vice versa for another web.

In a further another aspect of the present invention, an exhaust-gas purifier is disclosed in which while the exhaust gas passes through the zigzag channels defined between the adjoining webs, the particulate matters gasborne in the exhaust gas flow with coming into contact with the wire netting or metallic nonwoven fabric or remaining tentatively in the zigzag channels and in doing so experience oxidation and get burned. Moreover, there is disclosed an exhaust-gas purifier in which while the exhaust gas passes through the zigzag channels defined between the adjoining webs along the grooves made on the webs, the particulate matters trapped in the zigzag channels are subjected to the oxidizing reaction over time with the aid of the catalyst deposited on the carrier to get disappeared.

With the carrier for exhaust-gas purification constructed as stated earlier, both the corrugated web and flat web of wire netting or metallic nonwoven fabric are overlapped each other and then wound up together or stacked on top of each other to form a honeycomb construction extending along the grooves on the corrugated web to provide channels made open at the ingress and egress thereof to allow the exhaust gas passing through there. Corrugations over the web along the channels through which the exhaust gas is passed help increase areas coming into contact with the exhaust gas, thereby increasing chances to make contact of the exhaust gas with the catalysts including oxidizing catalyst, three-way catalyst, NOx-selectively reducing catalyst, and so on coated over the carrier to oxidize and/or reduce harmful materials including HC, NOx, CO to become harmless materials including water, carbon dioxide, nitrogen, and so on, thus getting the harmful materials disappeared. With the carrier for exhaust-gas purification of the present invention, especially, the corrugated web is impressed to have the zigzag ridges to render the channels zigzag so as to increase the areas coming into contact with the exhaust gas. Moreover, crimped surface of the web made of wire netting or metallic nonwoven fabric raises a turbulent flow in the exhaust gas to encourage the exhaust gas to flow while making contact with and collision against the corrugations over the channel wall. Thus, the chances of contact of the harmful materials with the catalyst increase thereby ensuring high performance of redox reaction. The exhaust gas passing through the channels are so little permitted to move across the web, but forced dominantly along channels with keeping contact with channel walls. As a result, particulate matters such as soot or the like are ensured to continue flowing smoothly through the channels without giving rise to clogging or choking.

The carrier construction of the present invention, as very large in surface area coming into contact with the exhaust gas to prove extremely high purifying performance, can be made small in size and produced at low costs. The NOx-selectively reducing catalyst using reducing agent, because of very high performance, makes it possible to shrink distinctively the purifier down and moreover is hard to exfoliate away from the metallic carrier with durability, as opposed to the ceramic carrier. Processing efficiency of the carrier construction can be controlled by changes of the exhaust-gas channels on the corrugated web in their transverse section, whether parallel or zigzag, and/or modifications of specification of the wire netting (wire diameter, number of mesh, number of laminated sheet). The zigzag channels through which the exhaust gas is passed are preferable to effectively trap the particulate matters gasborne in the exhaust gas to get the particulate matters disappeared. The web of wire netting or metallic nonwoven fabric capable of wound up or stacked on top of each other into the column allows greater freedom of carrier forming, easier working and less costs in production than the prior thin plates of stainless steel. The prior stainless steel plate of 20~30 μm in thickness is expected hardly any elongation, while the carrier constituted with the web made of wire netting or metallic nonwoven fabric allows great freedom of forming, easy working into a specific configuration and inexpensive production costs.

Corrugations, or ridges and grooves between successive ridges, are made easily and inexpensively on the web for the carrier by coining or embossing in which a blank web is rolled or pressed between engraved dies or cylinders. The corrugated webs, because of getting entangled easily with each other, need not to positively join together each other.

With the exhaust-gas purifier having the carrier constructed as stated earlier, as the channels through which the exhaust gas is passed are demarcated from the specific parts to trap the particulate matters (PM), the filter can get rid of clogging of PM or the like, thereby ensuring cutting back the particulate matters by as much as about from 40 to 80%. Moreover, the harmful materials including soot, HC, NOx, and so on are burned or subjected to oxidation-reduction with the aid of the catalysts in the absence of the PM clogged in the filter to get disappeared. While the exhaust gas passes through the zigzag channels along the grooves in the corrugated web of wire-netting or metallic nonwoven fabric with making collision against the irregular walls on the corrugated web, the PM extracted from the exhaust gas after collision is trapped, but not clogged in the exhaust-gas channels. The trapped rate of the PM may be adjusted by modifications of the wire netting (wire diameter, number of mesh, number of laminated sheet), and/or changes of the exhaust-gas channels on the corrugated web in their transverse section and/or in their zigzag contours. With the filter constructed according to the present invention, in other words, the harmful materials such as the PM or the like gasborne in the exhaust gas flows through the zigzag or parallel channels while coming into contact with the channel walls, and in doing so experiences burning or oxidation-reduction. The PM remaining in the exhaust without burned, oxidized and/or reduced, even if trapped or stagnated over the channel walls, doesn't get the exhaust-gas channels clogged. The PM trapped is subjected to burning and oxidization over time to get disappeared, thereby ensuring cutting back the PM by as much as about from 40 to 80%. The filter constructed as stated earlier makes sure of smooth flow of the exhaust gas constantly passing through the exhaust-gas channels with causing no problem negatively affecting the running conditions of the vehicle. With the exhaust-gas purifier of the present invention in which filter is made to have parallel or zigzag channels whose exhaust channels are demarcated from the specific parts to trap the PM, the exhaust channels through which the exhaust gas is passed can get rid of clogging of PM and further the PM trapped is gradually subjected to either burning and oxidization over time with the aid of the catalysts to get disappeared or burning and oxidization with exhaust heat emitted from hot exhaust gas of the engine or NO2 to get disappeared. Thus, the filter of the present invention contributes to significant improvement on trapping rate of the PM entrained in the exhaust gas.

BRIEF DESCRIPTION OF THE DRAWINGS

in FIG. 10(A) there is shown behavior of the exhaust gas passing at slow velocity; and in FIG. 10(B) there is shown behavior of the exhaust gas passing at high velocity:

in FIG. 11(A) joints in number are in proportion to sectional areas of the channels across the adjacent webs; in FIG. 11(B) joints radiating out are split in places; and in FIG. 11(C) joints get thicker in width towards an outside canister:

DETAILED DESCRIPTION OF THE PREFERRED EMBODIMENTS

The exhaust-gas purifiers having incorporated with a carrier for exhaust-gas purification according to the present invention is envisaged purifying exhaust gases emitted out of possible sources including engines, burners, gas generators, and so on in a way forcing the exhaust gases through across a filter installed in an exhaust line to burn off harmful materials including particulate matters (PM), soot, HC, NOx or the like gasborne in the exhaust gases the aid of catalysts, or convert the harmful materials with redox reaction into harmless materials to get the harmful materials disappeared. The carrier for exhaust-gas purification according to the present invention is most befitted for filters installed in a tailpipe that emits exhaust gases coming from engines, especially diesel engines mounted on vehicles, whether new or used cars.

Described below in detail with reference to the accompanying drawings will be preferred embodiments of exhaust-gas purifiers having incorporated with a carrier for exhaust-gas purification according to the present invention.

Figure 1:
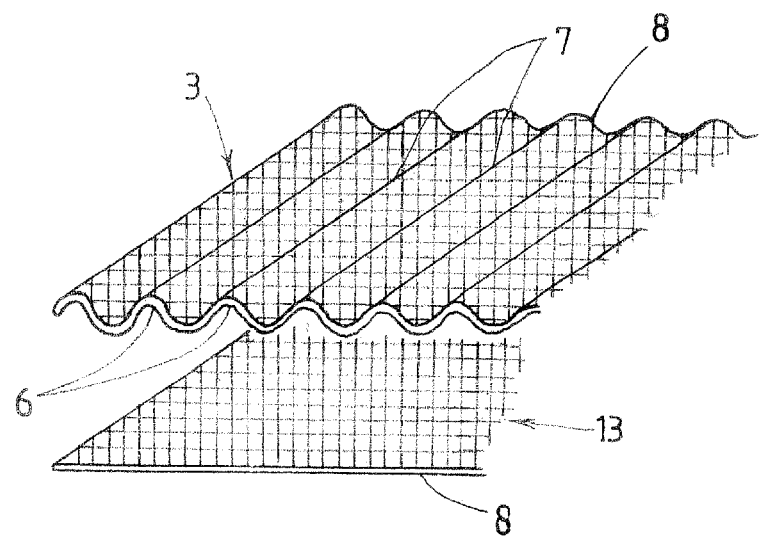
FIG. 1 is a schematic illustration explaining production process of a carrier for exhaust-gas purification according to the present invention.
Figure 2:
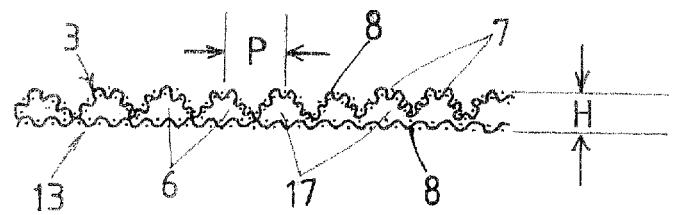
FIG. 2 is a view in front elevation showing layered relation of a corrugated web with a flat web in the carrier of FIG. 1.
Figure 3:
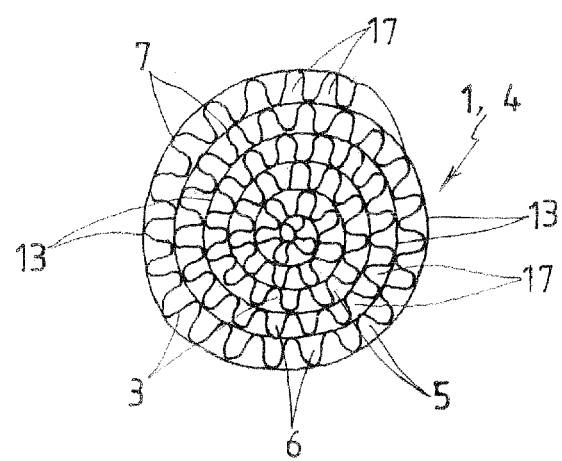
FIG. 3 is a view in front elevation showing a cylindrical column made by winding up in a spiral manner the layered webs of FIG. 2.

With the exhaust-gas purifier constructed according to the present invention, a filter 20 composed of a carrier generally designated 1 in the drawings and coated with catalysts is incorporated in an exhaust system. The carrier 1 is effective to convert harmful materials including particulate matters (PM), soot, HC, NOx or the like in the exhaust gas leaving exhaust ports of engines, combustion furnaces, smokestacks and the like with the aid of catalytic redox reaction into harmless materials including water, carbon dioxides, and nitrogen. The carrier 1 features such construction that corrugated webs 3 and flat webs 13, both made of either wire-netting webs 8 or metallic nonwoven webs 8, are stacked alternately on top of the other as shown in FIGS. 1 to 3 into a column 4 that is made therein with channels 5 through which exhaust gas is passed from ingresses 9 at any one of opposite ends of the column 4 to egresses 10 at another end of the column 4 along grooves 6 depressed in the corrugated webs 3 made from the webs 8. As an alternative, a single sheet of the corrugated web 3 alone or more than one web is wound up in spiral fashion to make a column 4 of layered winds as seen in FIGS. 4 to 6 and 12 to 15.

Figure 12:
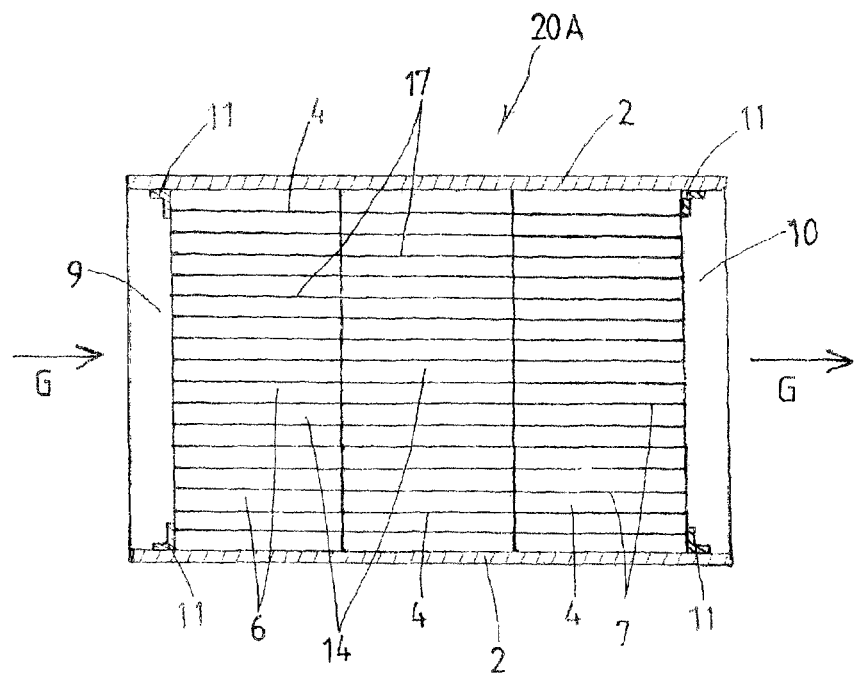
FIG. 12 is a schematic view showing a preferred version of an exhaust-gas purifier unit in which three columns of carrier winds are fitted together in series inside the canister and held at axially opposite ends with retainer members.
Figure 13:
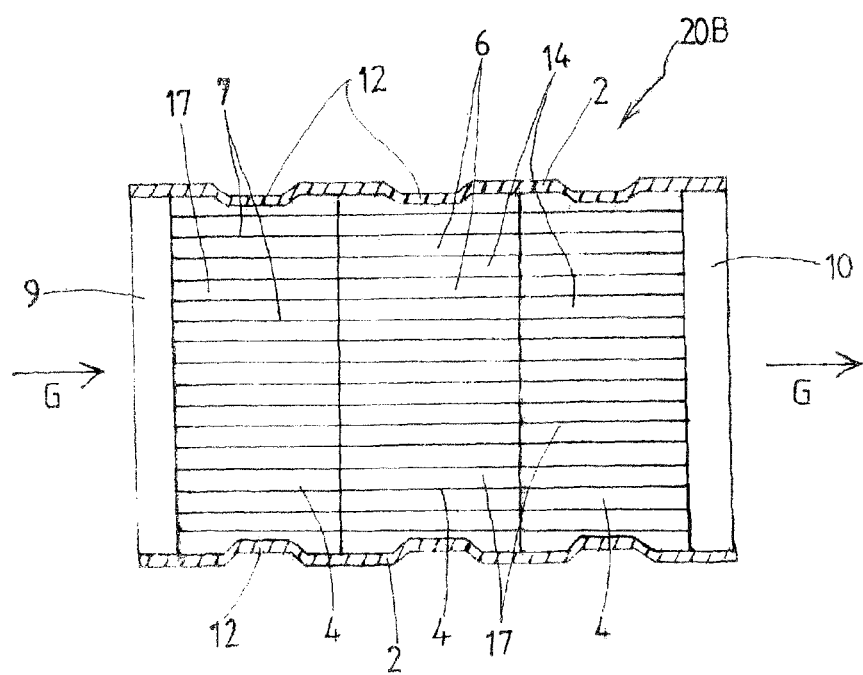
FIG. 13 is a schematic view showing another version of an exhaust-gas purifier unit in which three columns of carrier winds are fitted together in series inside the canister that is radially reduced in places to squeeze tightly the columns of carrier winds.
Figure 14:
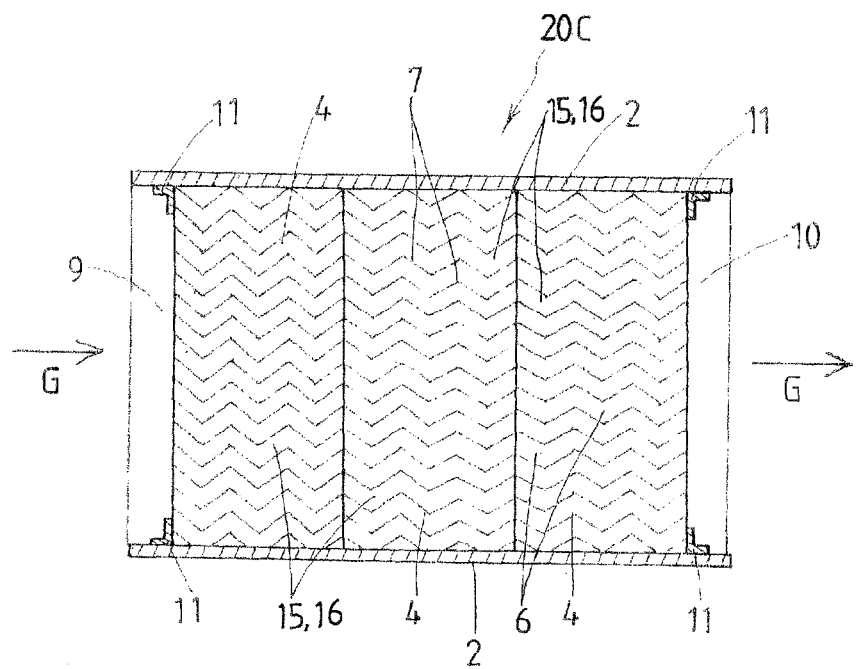
FIG. 14 is a schematic view showing a further another version of an exhaust-gas purifier unit in which three columns of carrier winds are fitted together in series inside the canister and held at axially opposite ends with retainer members.
Figure 17:
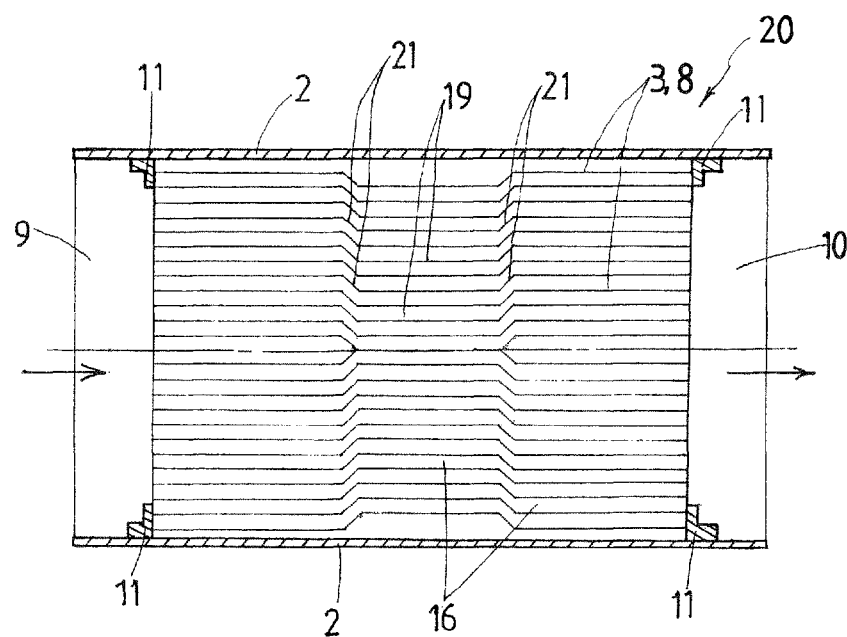
FIG. 17 is a view in axial section showing a filter unit in which a canister has accommodated therein a column of wound webs that are depressed below a wed surface partially in widthwise direction.

Overall, the column 4 is made in a cylinder including right circular cylinder, regular prism, and so on. The channels 5 formed along the grooves 6 on the corrugated web 3 to allow the exhaust gas passing through there remain open at their opposite ends and extend either straight or zigzag from their ingresses at any one of opposite ends of the column 4 to their egresses at another end of the column 4 to provide a honeycomb construction. With the exhaust-gas purifier constructed as stated earlier, the carrier 1 having the channels 5 straight as shown in FIGS. 12 and 13 are suited for purifying harmful materials of HC, NOx or the like, whereas the carrier 1 having the channels 5 zigzag as shown in FIGS. 14 and 17 are befitted for excluding harmful materials of particulate matters in addition to HC, NOx or the like.

Weaves of wire netting are unspecified for the web 8 and metallic nonwoven fabric may be also selected. Art of producing the corrugated web 3 is to press engraved dies like gears and the like against the flat web 8 to impress ridges 7 extending in widthwise direction and grooves 6 correspondingly in reverse on the web 8. Moreover, the flat web 13 is made by reforming the web 8 evenly. The web 8 wound up into the column 1 is coated with catalysts for oxidation and/or reduction of harmful materials into harmless materials. The web 8 of wire netting or metallic nonwoven fabric is made crimped or uneven to provide extremely large surface areas to carry much catalyst thereon. With the web 8 made as stated earlier, thus, the exhaust gas G is allowed to come into easier contact with much catalyst deposited over the larger surface areas to ensure high performance in purification of exhaust gas. Moreover, the crimpy surface areas over the carrier 1 disturb the flow of exhaust gas G along the crimpy surface areas to cause turbulent flows, thereby increasing chances to make contact of the exhaust gas G with the catalysts over a plenty of time to encourage redox reaction of harmful materials. The webs 8 for the carrier 8 are constantly experience repeated thermal stress and further different temperature distribution in some places. The wire netting or metallic nonwoven fabric for the web used in the present invention, because of made of very thin wires, can tolerate flexibly any deformation due to different temperature distribution with causing no local plastic deformation, thereby preventing deposits of ceramics and the like over the web against exfoliation with durability. Turbulent flow caused in the exhaust gas G flowing over the carrier 1 largely encourages flowing contact of the exhaust gas G with the catalysts coated on the carrier 1 to elevate purification performance regardless of the type of catalysts. Thus, the purifier with the carrier of the present invention is easier to largely shrink it down even if expected to be comparable in purification performance to the prior purifier.

Figure 4:
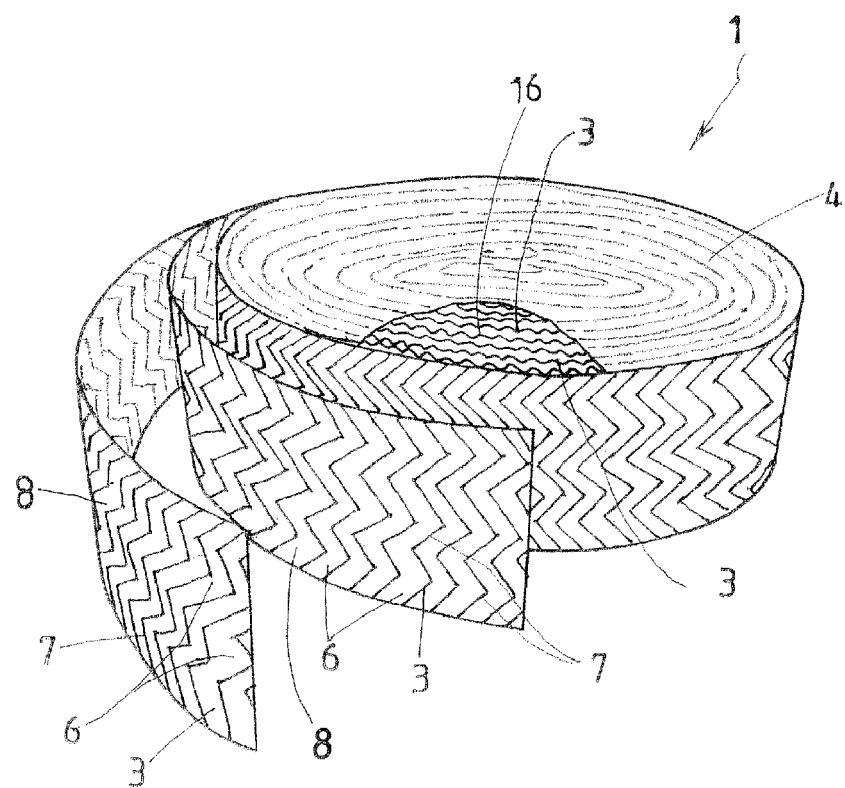
FIG. 4 is a schematic illustration, partially cut away, explaining a process for making a cylindrical column in which corrugated webs having zigzag ridges different in bent angle from one another are wound up in a spiral manner.
Figure 5:
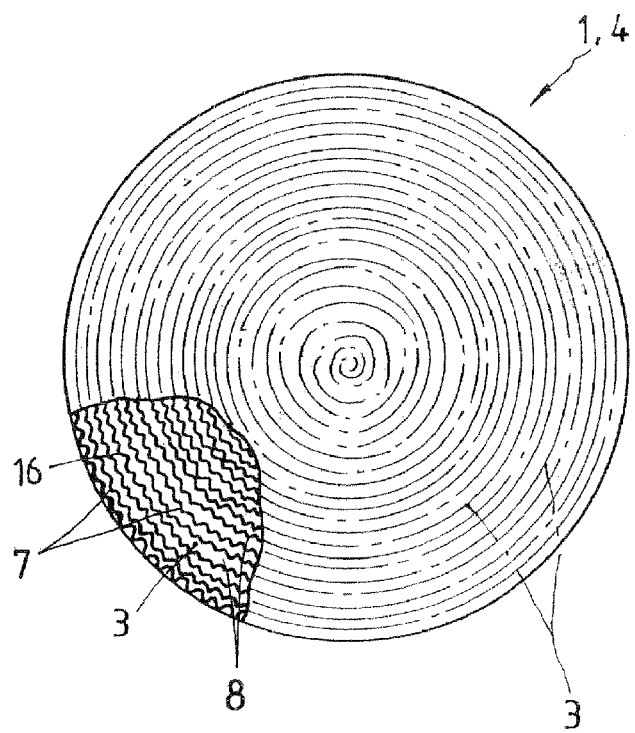
FIG. 5 is a partially cut away view in front elevation of the corrugated webs wound up into the cylindrical column of FIG. 4.
Figure 6:
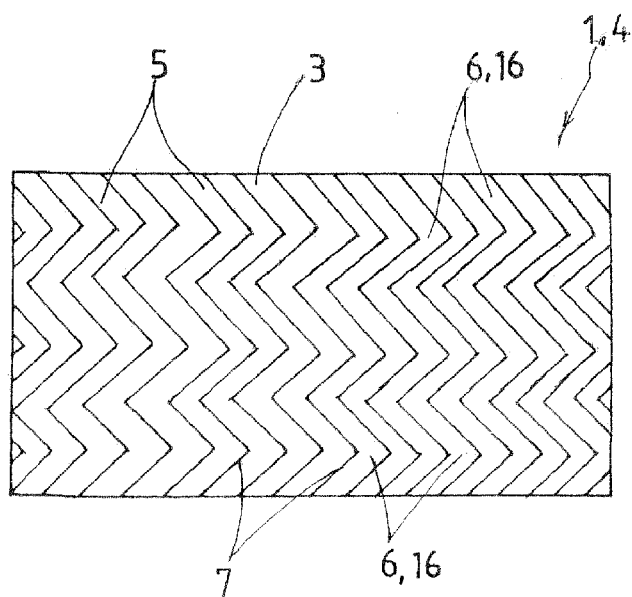
FIG. 6 is a view in side elevation of the cylindrical column of FIG. 4.
Figure 7:
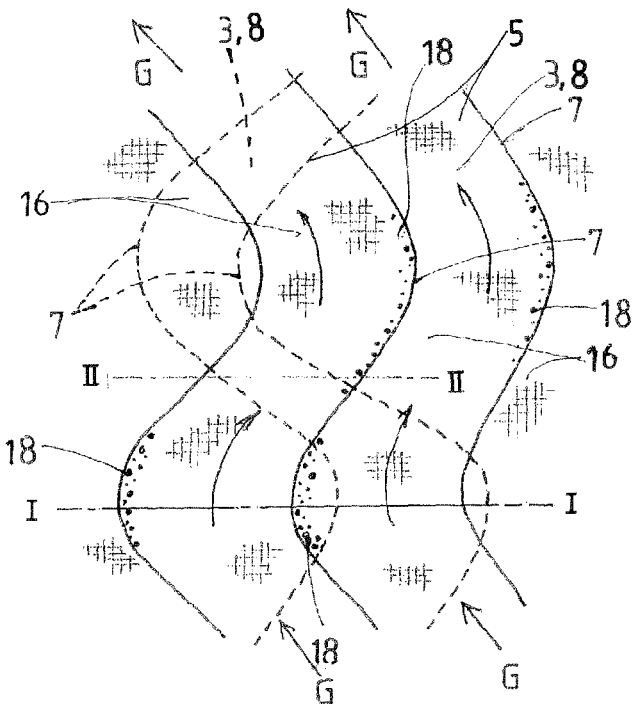
FIG. 7 is a schematic illustration explaining a crossing geometry of the ridges raised above each of the layered webs in the cylindrical column of FIG. 4.
Figure 16:
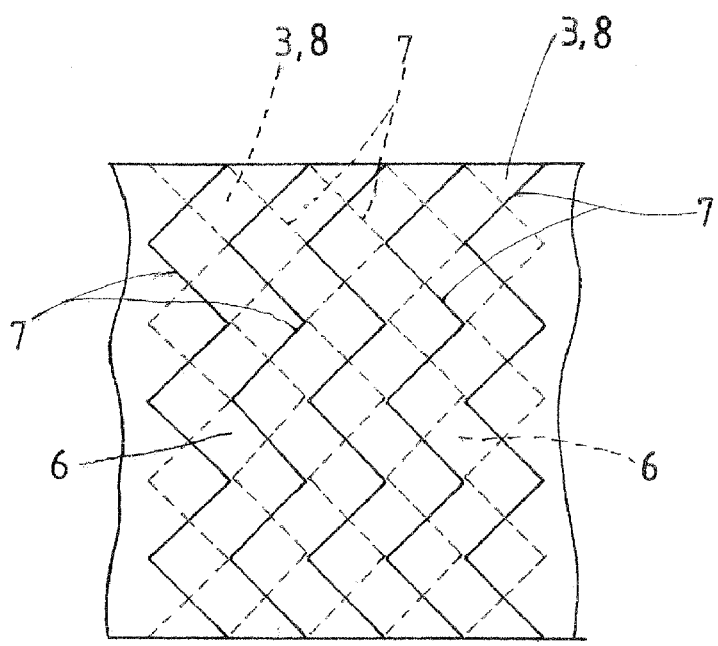
FIG. 16 is a schematic illustration explaining a crossing geometry of the ridges raised above each of the layered webs in the carrier column for the filter.

The corrugated web 3 is made by only coining or embossing in which a blank web is rolled or pressed between dies such as mating rolls, although not shown, which are engraved with zigzag patterns to impress ridges or elevations 7 and grooves or depressions 6 correspondingly in reverse between any two adjacent ridges 7 on the blank web. The ridges 7 on the corrugated web 4 are coined by the engraved dies to extend in parallel with an axial line of the column 4. As an alternative, the ridges 7 are stamped to extend obliquely with respect to an axial line of the column 4, especially, zigzag relative to the axial line of the column 4 from the ingress 9 towards the egress 10 as shown in FIGS. 4 to 6. Thus, the carrier 1 is made to have either many parallel channels 17 each of which is defined between any two adjacent ridges 7 extending in parallel with one another or many zigzag channels 17 each of which is defined between any two adjacent zigzag ridges 7 extending in parallel with each other. With the column 4 constructed as shown in FIGS. 5, 7 and 16, more than two sheets of corrugated webs 3 are laid to overlapped each other in geometry getting the zigzag ridges 7 on each web 3 staggered or crossed with the zigzag ridges 7 on other webs 3, and then a stack of corrugated webs 3 is wound together in a spiral fashion. Still referring to FIG. 16, there is shown two sheets of wire-netting web 3 are shown as being overlapped in geometry getting the zigzag ridges 7 on any one of the webs 3, depicted in solid lines, staggered or crossed with the zigzag ridges 7 on other webs 3, depicted in broken lines. As an alternative, although not shown, the ridges 3 embossed on the web 3 are made in geometry that a length oblique with respect to the axis of the column 4 and another length parallel with the axis of the column 4 alternate each other. The exhaust-gas purifier according to the present invention features that the exhaust gas G, as passing through the channels 5 defined along the grooves 6 between adjacent webs 3 while experiencing turbulent flows, is subjected to burning or redox reaction to convert harmful materials in the exhaust gas into harmless water, carbon dioxide, nitrogen.

Figure 8:
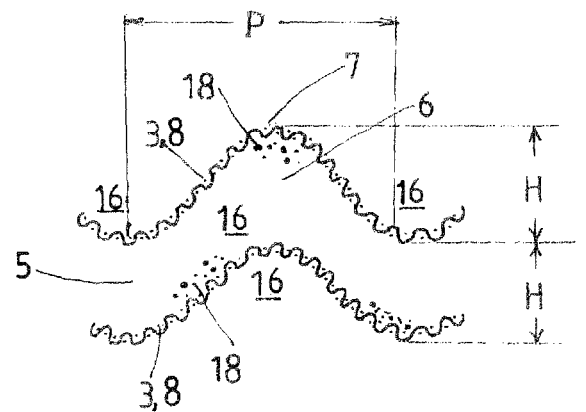
FIG. 8 is a fragmentary view in section taken along the plane of lines I-I of FIG. 7.
Figure 9:
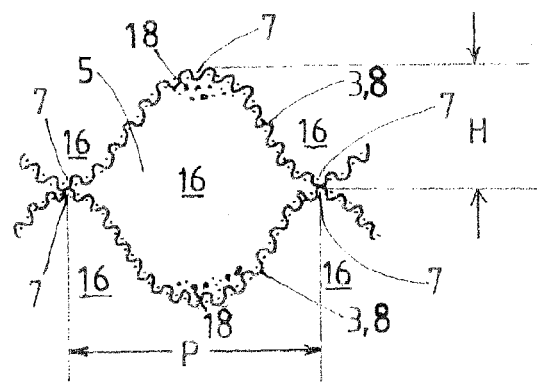
FIG. 9 is a fragmentary view in section taken along the plane of lines II-II of FIG. 7.
Figure 10:
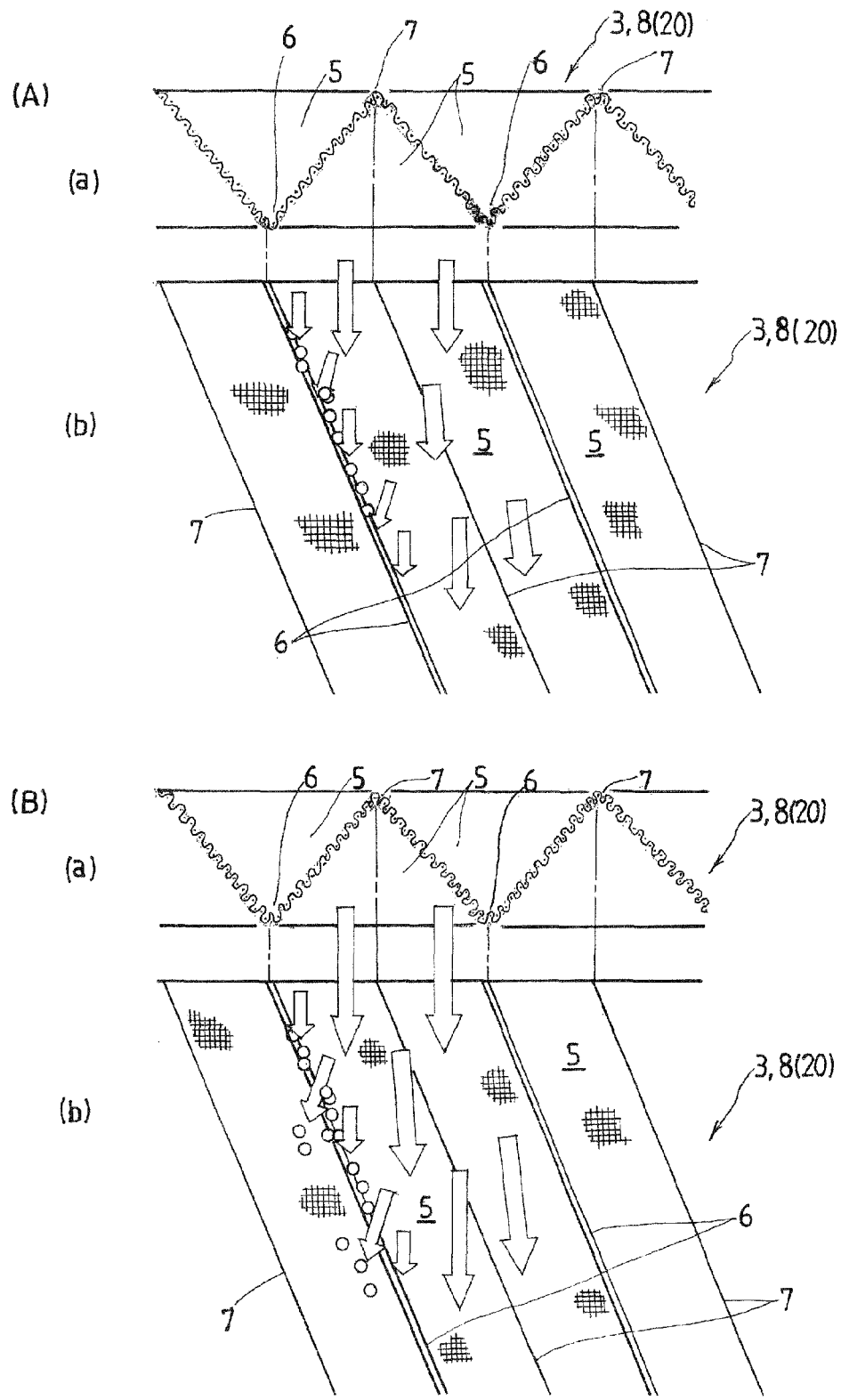
FIGS. 10(A) and 10(B) are schematic illustrations to explain about how exhaust gas passes through channels defined along grooves inside the cylindrical column.

The exhaust gas G as shown in FIG. 7 is allowed to pass in the direction of arrow signs through the zigzag channels 16 defined between the corrugated webs 3 of the carrier 1. Still referring to FIGS. 7 to 9, the exhaust gas G, while passing through the zigzag channels 16 defined between the corrugated webs 3, travels with keeping constantly flowing contact with the corrugated webs 3, or remains or stays for a time in around bent areas where particulate matters 12 are gradually oxidized and burned off. The particulate matters 18 gasborne in the exhaust gas G, as passing through the zigzag channels 16 while coming into contact with crimped walls of the corrugated webs 3, disappear in large part by the aid of the catalysts carried over wire-netting or metallic nonwoven fabric and still remain in part in bent areas in the zigzag channels 16 to be burned off there with heat of the exhaust gases elevated in temperature or oxidized with $NO_2$ or further gradually burned away with the aid of the oxidizing catalysts. As a result, the zigzag channels 16 are kept against clogged with the particulate matters 18, ensuring smooth flow of the exhaust gas G Referring next to FIGS. 10(A)-10(B), there are a sectional view in (A)-(a) and a plan view in (A)-(b) to illustrate flow behavior of the exhaust gas G at low velocity. Flow behavior of the exhaust gas G at high velocity are illustrated in view (B)-(a) in section and in view (B)-(b) in plan. As seen in FIG. 10, higher the exhaust gas G in the filter 20 is in flow velocity, the greater the tendency to try to travel straight in the filter 20. Thus, as the exhaust gas G moves at relatively high velocity through the channels 16 slightly bent in zigzag or serpentine fashion, the particulate matters (PM) gasborne in the exhaust gas G are trapped or caught on the wire netting or metallic nonwoven fabric defining the channels 15. In contrast, some exhaust gas G traveling at very high velocity, because of greater in tendency of flowing straight in parallel with the axis of the cylindrical filter than at relatively low velocity, goes in one side and out the other of the wire-netting or metallic nonwoven sheet around the channels 5. As a result of the flow behavior as stated earlier, amount of PM trapped on the wall surfaces of the channels 5 declines. If that happens, the less the amount of trapped PM will result in a less purification rate of the PM. Like so much of what is stated earlier, the exhaust gas at relatively low velocity behaves in reverse to the conditions at the high velocity.

Figure 23:
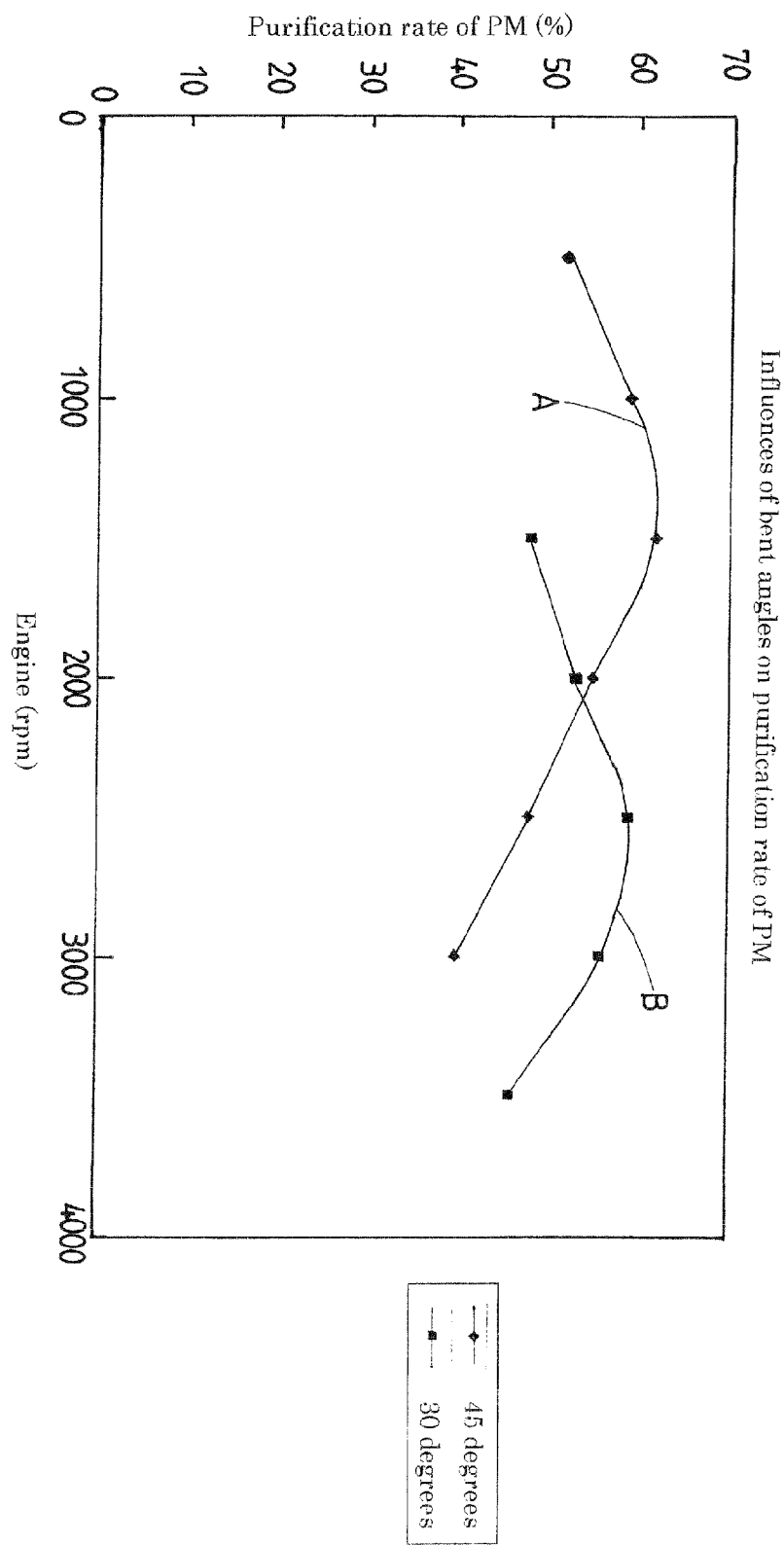
FIG. 23 is graphic representation illustrating how the bent angles of ridges on a corrugated web affect purification rates of harmful particulate matters in response to engine rpm.

With the exhaust-gas purifier constructed according to the present invention, the ridges 7 on the corrugated web 3 are embossed in a zigzag fashion having a series of angles across angular range of about 10°~50° with respect to the axis of the column 4 to form the zigzag fashion pattern 16 for the channels 5 through which the exhaust gases are passed. The cylindrical canister accommodates therein more than one column 4 in series. Oblique angles of the ridges 7 embossed on the corrugated web 3 of the column 4 may be made either identical or different at the upstream side and downstream side of the exhaust gas G. Considering the flow behavior of the exhaust gas G in the channels 5, it is preferred that the ridges 7 are bent with angles of 10°~50°. The preferred range of bent angles of the ridges 7 were verified by investigations on purification performance in hydrocarbon using metallic honeycombs coated with platinum, one of which was constructed according to the present invention while the other was prior art. A major reason why the construction of the present invention demonstrated high purification rate was considered that the surfaces of the wire netting or metallic nonwoven fabric to form the web 8 set off much turbulent flow in the exhaust gas G to encourage the exhaust gas G to get in contact with the catalysts. Knowing oblique angles of the ridges 7 best for the exhaust gas G was a challenge. FIG. 23 shows the purification rates of PM related with engine rpm are different dependently of the oblique angles of the ridges 7 impressed on the corrugated web 8. When the oblique angle of the ridges 7 is at 45°, the purification rate remains in high-performance level in the range of engine rpm from 500 rpm to 2,000 rpm as seen in a curve A in FIG. 23, whereas high-performance level of the ridges 7 oblique at 30° shifts towards the range of engine rpm from 2,000 rpm to 3,500 rpm as seen in a curve B in FIG. 23. The flow rate of the exhaust gas G varies much as the engine is operated under different conditions from low speed at idling to top speed at full throttle. To keep the purification rate equally high over the widely different operating conditions of the engine, it is preferred to unite ridges different in oblique angle, one for low speed and the other for high speed, in a canister in a fashion changing the bent angles in the zigzag channels twice and more times from the upstream side to the downstream of the exhaust gas.

With the exhaust-gas purifier in which the ridges 7 are different in oblique angle between the upstream and downstream sides, it is desirable for high trapping effect that the filter 20 of the corrugated web 3 less in oblique angle is placed at upstream side while another filter 20 of the corrugated web 3 more in oblique angle is placed at downstream side. Generally speaking, as the exhaust gas much in quantity of flow is high even exhaust temperature, the trapped PM is easier to burn out. Thus, only a little amount of PM is stacked on the filter 20. With the exhaust gas at low speed comparatively less in flow rate contrary to the above, the PM because of low in even exhaust temperature is often liable to deposit much inside the filter 20. To cope with this, the filter 20 of the corrugated web 3 less in oblique angle is laid at upstream side to trap much PM there, although not high trapping efficiency, while reducing the burden of stacked PM on the downstream filter 20 greater in oblique angle. Overall, the PM can be trapped efficiently over the whole filter. With another version of the exhaust-gas purifier of the present invention, the corrugated web 8 with ridges 7 less in oblique angle is wound up together with another web 8 with ridges 7 greater in oblique angle to trap equally over widely different operating conditions of the engine from low speed to top speed. As an alternative, one carrier 1 of the corrugated web 8 with ridges 7 constant in oblique angle and another carrier 1 with ridges 7 two or more different in oblique angle are placed in series in the flowing direction of the exhaust gas to ensure steady performance over widely different operating conditions of the engine from low speed to top speed. As an another alternative of the filter 20, more than two webs 8 with different ridges 7 in bent angles from each other are wound up or overlapped on top of the other in combination to make a single carrier 1, thereby ensuring steady performance over widely different operating conditions of the engine from low speed to top speed. Combining some carriers 1 made as stated just above in series in the flowing direction of the exhaust gas is effective for even more purification rate and further permits large quantities of standardized interchangeable carriers 1 to be made at low unit costs.

Any of three-way catalyst, oxidizing catalyst and NOx-reducing catalyst (catalyst reducing selectively NOx) is selected for the catalysts coated over the carrier 1. The carrier construction of the present invention can largely raise purification performance with the three-way catalyst, oxidizing catalyst or NOx-reducing catalyst to shrink distinctively the purifier down if expected to be comparable in purification performance to the prior purifier and further make production at low costs possible. With the NOx-reducing catalyst using reducing agents such as urea, gas oil or the like, it is extremely critical to blend uniformly the exhaust gas G and the reducing agent mixed with the exhaust gas G. Purifying systems mounted on vehicles need dispersing and blending uniformly the reducing agents into the exhaust gas G within an extremely limited space. Nevertheless, the prior carriers are apt to cause poor blending between the exhaust gas G and the reducing agents. In contrast, the product of the present invention is in favor of smooth dispersion and blending of the exhaust gas with the reducing agents. The exhaust-gas purifier of the present invention has as its major object to trap effectively the PM and besides to carry the NOx-reducing catalyst on the filter 20. The NOx-reducing catalyst using gas oil as reducing agent includes in many cases catalysts of platinum, silver or the like. The catalysts of platinum, silver or the like are intrinsically effective to burn off the PM. Thus, the filter 20 carried with the NOx-reducing catalyst traps the PM to get them burning off while reducing NOx thereby making it possible to let the purifier treat both the PM and NOx at the same time. With the exhaust-gas purifier of the sort recited earlier, the NOx-reducing catalyst of zeolite or the like is carried on the filter 20. In this case, the filter 20 is also effective to trap the PM simultaneously with treatment of NOx, permitting reduction of the purifier in construction and production at low unit costs. With the conventional carriers of ceramic or metallic honeycomb, the exhaust gas entering passes through individual cells, reaching the egress without mixing with other exhaust gas passing through adjacent cells. As opposed to the conventional carriers as stated earlier, with the carrier constructed according to the present invention, individual cells extend straight from the ingress 9 to the egress 10 while communicating with adjacent cells through networks in the wire netting or metallic nonwoven fabric. The carrier 1 of the present invention allows the exhaust gas G mixing together among the cells, thereby encouraging the exhaust gas G to keep continuous blending of the exhaust gas G with the reducing agents throughout the flow of the exhaust gas G inside the carrier 1 to ensure very high purification rate even though the reducing agent at the ingress 9 of the carrier 1 is somewhat worse in uniformity. In tests carried on commercial engines, the product of the present invention was three times in SV (1/h) compared with prior art, thus verified comparable in performance to the prior art. The SV (1/h) refers to a quotient resulting from dividing a gas flow rate by a carrier volume.

The wire netting or metallic nonwoven fabric for the web 8 is constituted with wires of stainless steel or iron-aluminum-chromium alloy. Moreover, the wire for wire-netting to make the web 8 is preferably 0.03 mm~0.25 mm in diameter. The wire netting to provide corrugated and flat webs 8 has preferably a mesh pattern of 30~200 meshes. When a set of at least three sheets of web 8 is prepared to make the filter 20, inward wire nettings of the webs 8 are made fine in mesh while outward wire nettings are coarse in mesh. The number of mesh in the web 8 differs between the warp and the weft in such a relation that the mesh in the warp is greater than in the weft. The number of mesh in the web 8 in the version now discussed is designed to have 30~100 meshes in the warp while 60~200 meshes in the weft. In other words, the warp in the web 8 lies to extend in lengthwise direction of the web 8 while the weft lying in the widthwise direction of the web 8. The wire netting as well-known in the art is made with the warp and the weft woven together. Speed to weave the netting is dependently of the number of mesh on the weft. More the number of mesh on the weft is, worse the production rate in one weaving becomes to require lengthy production time with high unit costs. With the web with mesh more in the warp, in contrast, although it takes somewhat more time to arrange the warp on the loom, the fewer the mesh in the weft results in a remarkably shorter time required for weaving, making weaving work more efficient. Thus, the fewer the mesh in the weft is more beneficial to make weaving speed of the loom to cut back on production costs of the wire netting. On the other hand, between the netting of 80 meshes on the warp while having 80 meshes on the weft and another netting of 120 meshes on the warp while 40 meshes on the weft, for example, there is no difference in surface areas per unit area, which have direct relation with the performance in the carrier 1.

Still referring FIG. 2, there are shown dimensional relation of the ridges 7 and grooves 6 made on the corrugated web 8. It is most preferable to determine a pitch P between successive ridges 7 at a range from 1 mm to 6 mm. The pitch P equal or less than 1 mm is as restricted as to trend to be clogged with the PM, whereas the pitch P equal or more than 6 mm is too wide to encourage the exhaust gases G to make sufficient contact with the catalysts. Modification of the pitch P between successive ridges 7 in lengthwise direction results in alteration of the channels 5 in their widths to cause better turbulent flow in the stream of the exhaust gases G. With another version of the corrugated web 3, although not shown, the pitch P in one of different webs 3 is made larger at the upstream side of the gas flow than at the downstream side, and vice versa for another web 3. The two kinds of webs 8 different in pitch pattern are laid alternately to form the filter 20. As a further alternative, the pitch P may be made constant throughout the length of the web 3. The smaller the pitch between successive ridges 7 results in more efficient to trap the PM, but if the pitch between successive ridges 7 is too small broad, sometimes the filter 20 is clogged with the PM. To develop the exhaust-gas purifier more efficient to tarp the particulate matters, accordingly, it is beneficial to wind up largely the corrugated web 3 comparatively small in pitch between successive ridges 7 together with partially other corrugated web 8 relatively wide in pitch between successive ridges 7 into the filter. Even under the operating condition where the PM doesn't burn off over time, but deposits over the filter, the corrugation of larger pitch hardly gets clogged with the particulate matters. Thus, the preferred construction of the filter as stated earlier, even if the engine output falls a little, won't cause any obstacle to the driving long distance. The filter in which one filtering medium having the successive ridges 7 larger in the pitch or sparser at the upstream side than at the downstream side is combined alternately with the other filtering medium having the successive ridges 7 smaller in the pitch or thicker at the upstream side than at the downstream side is advantageous to control adequately a quantity of the exhaust gas passing in part across the filtering medium, thereby adjusting the PM trapping rate. A difference H between the bottom of the groove 6 and the crest of the ridge 7 is preferably at a range from 0.5 mm to 5 mm. When the difference H is equal or less than 0.5 mm, the channel 5 through which the exhaust gas G is passed is as low as to trend to be clogged with the PM, whereas the difference H equal or more than 5 mm is too high to encourage the exhaust gas G to make sufficient contact with the catalysts. With the filter constructed as stated earlier, adjustment of the pitch P between successive ridges 7 as well as the difference H between the groove 6 and the ridge 7 depending on the engine power and/or performance results in changes of zigzag channels 16 or straight channels 17 in their sizes to control the flow of the exhaust gas G.

The wire nettings or metallic nonwoven fabric to make the carrier 1 of the filter 20 is coated with at least more than one ceramic material selected from alumina ($AL_2O_3$), silica ($SiO_2$), zirconia ($ZrO_2$), seria ($CeO_2$), and titania ($TiO_2$). The carrier substrate for the carrier 1 is coated in advance with complex oxide powders containing any one or at least more than one of silica, alumina, seria, titania and zirconia. Moreover, the surface of the ceramic coating layer deposited over the substrate for the web 8 has carried with at least more than one reduction-oxidation catalyst selected from platinum (Pt), silver (Ag), potassium (K), palladium (Pd), iridium (Ir), iron (Fe), copper (Cu), barium (Ba), ruthenium (Ru) and rhodium (Rh).

Figure 11:
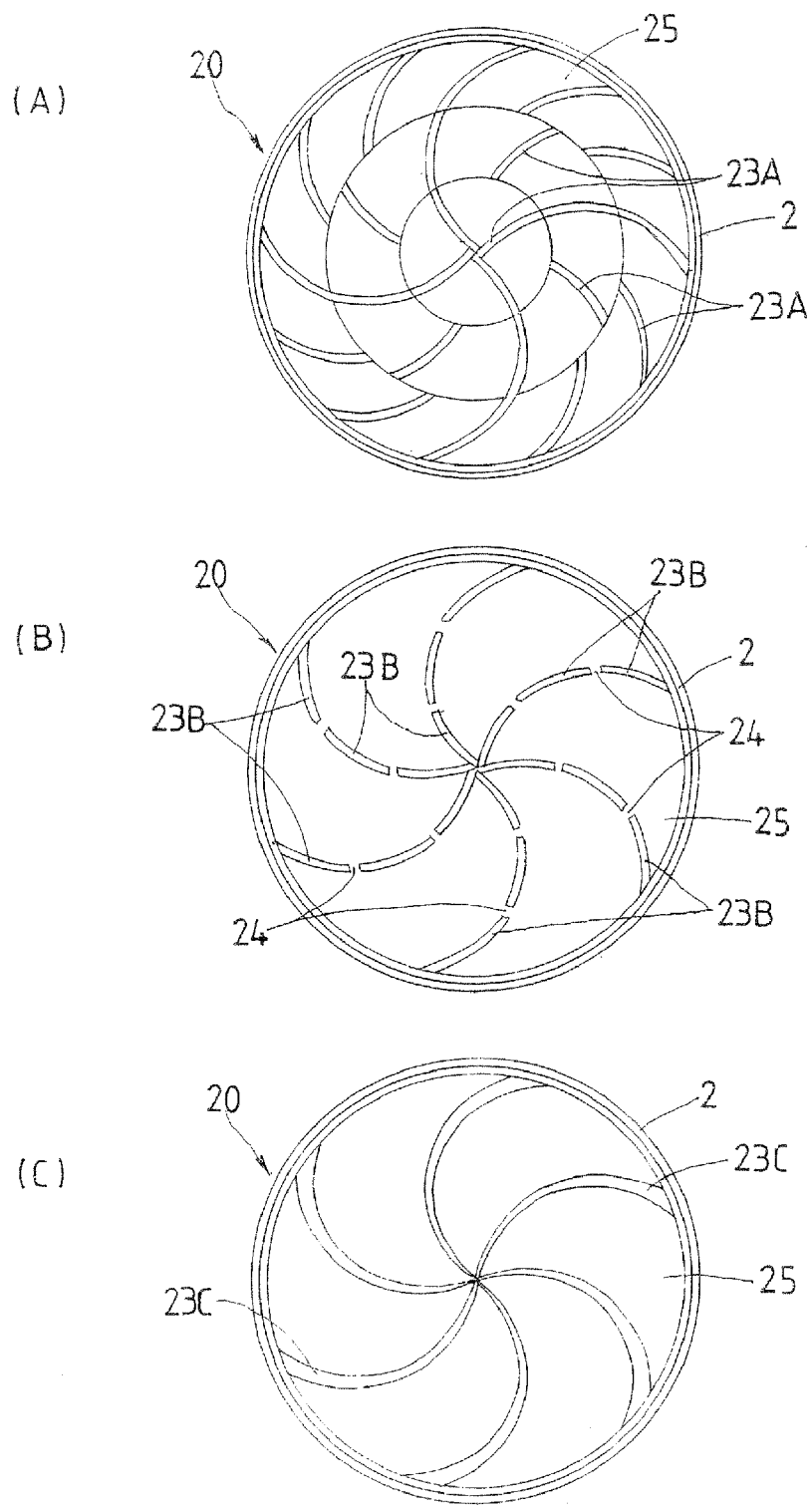
FIGS. 11(A), 11(B) and 11(C) are schematic illustrations how the webs are jointed together at axially opposite ends of the filter.

With the filter 20 constituted with the carrier 1 as shown in FIG. 11, brazing materials such as nickel, copper or the like join together the corrugated webs 3 and/or flat webs 13 stacked on top of each other to prevent the webs 3 and 13 against deformation or collapse, which might otherwise occur when the filter 20 was subjected to any external load including excessive vibrations, and so on or unreasonable thermal stress. Joining with brazing materials among the corrugated webs 8 and/or flat webs 13 in the filter 20 is preferable to keep them against deformation due to heat, especially when the filter 20 is urged to work at the temperature equal or more than 600° C. The web winds are joined together at any one or both of the opposite ends 25 of the filter 20 with, for example joints 23 of brazing materials. Especially, the brazing joints as shown in FIGS. 11(A)-(B) are made to extend radially in the form of intermittent lines 23A, 23B with a preselected width. As an alternative, the brazing joints are made gradually thicker in their widths as they are splayed radially outward as shown in FIG. 11(C). The joints 23A in FIG. 11(A) increase in number as they radiate out to ensure joint force exerted on the widthwise ends of the webs 8 evenly across the radial span of the filter 20. Especially, the winds of the webs 8 are joined together with twelve joints 23A at radially outermost circular area, eight joints 23A at in-between area, and four joints 23A at innermost area. With the version in FIG. 11(B), the joints 23B are split in places 24 to cast off any undesirable external force that would otherwise exerted on the joints 23B of brazing materials. In a further another version in FIG. 11(C), the brazing joints are made gradually thicker in their widths as they are splayed radially outward to ensure joint force exerted on the widthwise ends of the webs 8 evenly across the radial span of the filter 20. Brazing materials or brazing foils are applied or placed in advance over the crests of the ridges 7 of the corrugated webs 3 and local areas of the webs 8 expected to come into brazed coalescence with the ridges 7, thereby getting the adjacent webs 8 brazed together after the corrugated webs 3 are wound up into the filter 20. Moreover, the locations expected to make brazed coalescence between the adjacent webs 8 are preferably staggered from one another every wind when view in axial direction of the column 4.

With the honeycomb filter using metallic foils, application of brazing materials are universally carried out by either winding up the metallic foils together with the brazing foils or winding up the metallic foils while applying pasty brazing materials over the metallic foils. With the filter 20 constructed with the carrier 1 of wire netting or metallic nonwoven fabric according to the present invention, as opposed to the prior art, high strength resistant to thermal stress is ensured by only brazing the cylindrical column 4 at the axially opposite ends 25 thereof. The wire netting or metallic nonwoven fabric is rich in flexibility in every direction and therefore the joints of brazing materials to make coalescence among the webs to give the enough strength to the filter 20 are sufficient at only the opposite ends to make the filter 20 resistant against both mechanical and thermal stresses, giving enough strength to the filter 20. Moreover, the carrier 1 for the filter 20 made of wire netting or metallic nonwoven fabric of very fine wires, even though experiencing commonly repeated hot and cold temperatures with different temperature distributions in places, can resist against the stress due to uneven thermal distribution without causing plastic deformation. Thus, the joints spaced circularly away from one another at regular intervals, even just brazing, are effective to make the most of the unique characteristics of the carrier. If the filter 20 is brazed at the opposite ends 25 thereof along curved radiant lines lying on the axis of the cylindrical carrier 1, the carrier 1 because of being more rigid at the brazed areas than at everywhere else is constrained at areas along the curved radiant lines to be impaired in flexibility. In contrast, the joints 23 extending along curved radiant lines in a spiral shape help weaken the resistant force against the external pressure and further cuts 24 to separate the joints 23 in places help give more flexibility to the carrier 1. Moreover, the more the joints 23 are in area as they are splayed radially outward increase the strength of the filter 20. The filter 20 with catalysts experiences constantly a predetermined pressure because of pressure difference across the filter 20. Since a shearing stress exerted on the carrier 1 owing to the predetermined pressure rises universally in proportion to the radius of the carrier 1 as shifting from the inside out. Thus, it is preferable to make the brazing coalescence with the ends 25 of the filter 20 large in area as radiating out towards the outside circumferential edge. With the corrugated web 3 of wire netting or metallic nonwoven fabric in which the ridges 7 are made oblique with respect to the axis of the column 4, it is very tough to lay accurately the applied brazing materials or brazing foils along the are as to make the brazed coalescence between adjacent webs 8 that are wound up into the finished column 4. Nevertheless, as the areas to make the brazed coalescence between adjacent webs 8 can often vary from product to product, it is preferred to read in advance pattern images of the ridges 7 to make it easier to control precise positions of the brazing materials at the brazed coalescence between adjacent webs 8, ensuring more efficient brazing work than ever.

With the exhaust gas purifier of the present invention, more than one column 4 of the carrier 1, three columns 4 in FIGS. 12 to 15, fits into the canister 2, which is installed in an exhaust pipe in a way either connected at forward and aft ends thereof with the exhaust pipe or fitted inside the exhaust pipe. In one version of the carrier 1 in which ridges 7 on the corrugated web 3 are embossed to extend straight in parallel with the axis of the column 4, straight passages 17 defined in parallel with one another along the adjacent grooves 6 provide the channels 5 through which the exhaust gas is passed (seen in FIGS. 12 and 13). In another version of the carrier 1 in which ridges 7 on the corrugated web 3 are embossed to extend obliquely to the axis of the column 4, oblique passages 16 defined along the adjacent grooves 6 provide the oblique channels 5 through which the exhaust gas is passed. As a further alternative of the carrier 1 in which ridges 7 on the corrugated web 3 are embossed to extend zigzag with respect to the axis of the column 4, zigzag passages 16 defined along the adjacent grooves 6 provide the zigzag channels 5 through which the exhaust gas is passed (seen in FIGS. 14 and 15).

Still referring to FIG. 12, there is shown a filter 20A constituted with the carrier 1 to be installed into the exhaust pipe. The filter 20A fits into the exhaust pipe in geometry lying along the flowing direction of the exhaust gases. The filter 20A is composed of the canister 2 and three columns 4 installed inside the canister 2. The filter 20A is provided therein with straight passages 14 defined with the channels 5 through which the exhaust gas is passed straight from the ingress 9 to the egress 10 across the filter 20A. Among three columns 4 of the carrier 1, the upstream and downstream columns 4 come into abutment at their outward ends thereof against retainers 11 welded to ingress and egress edges of the canister 2, respectively, to keep the whole columns 4 against axial movement. Although not shown, it will be appreciated that a single carrier 1 may be installed inside the canister 2. Referring next to FIG. 13, there is shown another filter 20B constituted with the carrier 1 to be installed into the exhaust pipe. The filter 20B also fits into the exhaust pipe in geometry lying along the flowing direction of the exhaust gas. The filter 20B is composed of the canister 2 and three columns 4 installed inside the canister 2. The filter 20B has therein straight passages 14 defined with channels 5 through which the exhaust gas is passed straight from the ingress 9 to the egress 10 across the filter 20B. With the exhaust-gas purifier shown in FIG. 137, the canister 2 is reduced radially in places to squeeze tightly the columns 4 to hold the whole columns 4 inside the canister 2.

Figure 15:
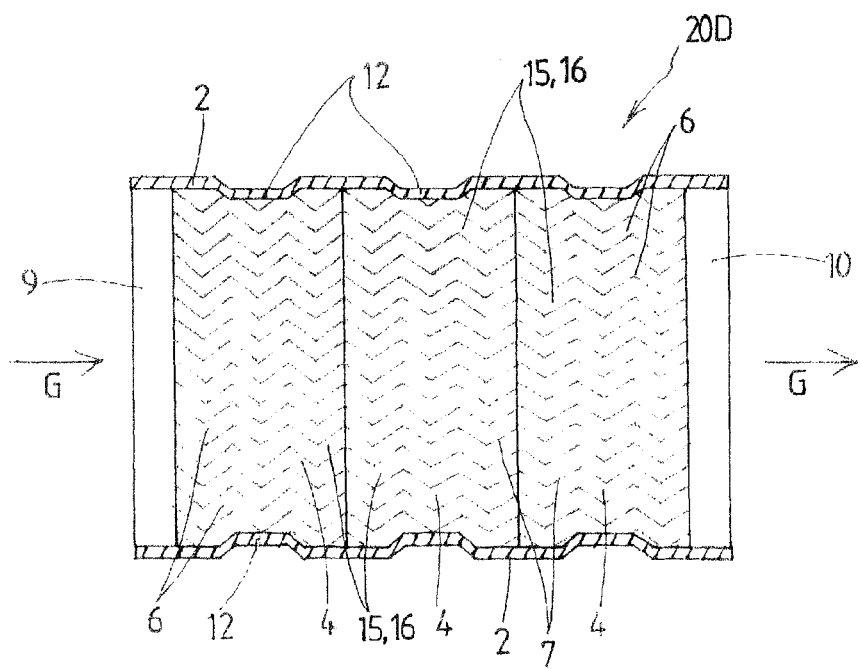
FIG. 15 is a schematic view showing a further another version of an exhaust-gas purifier unit in which three columns of carrier winds are fitted together in series inside the canister that is radially reduced in places to squeeze tightly the columns of carrier winds.

Still referring to FIG. 14, there is shown a further another filter 20C constituted with the carrier 1 to be installed into the exhaust pipe. The filter 20C fits into the exhaust pipe in geometry lying along the flowing direction of the exhaust gases. The filter 20C is composed of the canister 2 and three columns 4 installed inside the canister 2. The filter 20C is provided therein with zigzag passages 15 defined with the zigzag channels 5 through which the exhaust gas is passed zigzag from the ingress 9 to the egress 10 across the filter 20C. Among three columns 4 of the carrier 1, the upstream and downstream columns 4 come into abutment at their outward ends thereof against retainers 11 welded to ingress and egress edges of the canister 2, respectively, to keep the whole columns 4 against axial movement. Referring further to FIG. 15, there is shown another filter 20D constituted with the carrier 1 to be installed into the exhaust pipe. The filter 20D also fits into the exhaust pipe in geometry lying along the flowing direction of the exhaust gases. The filter 20D is composed of the canister 2 and three columns 4 installed inside the canister 2. The filter 20D has therein zigzag passages 15 defined with channels 5 through which the exhaust gas is passed straight from the ingress 9 to the egress 10 across the filter 20D. With the exhaust-gas purifier, the canister 2 is reduced radially in places to squeeze tightly the columns 4 to hold the whole columns 4 inside the canister 2. With the versions 2A, 20B, 20C and 20D of the filter constructed as stated earlier, although not shown, crossed metallic wires are placed transversely on the ingress 9 and egress 10 of the canister 2 having accommodated the columns 4 therein to keep the corrugated webs 3 and flat webs 13 against moving past each other.

Figure 18:
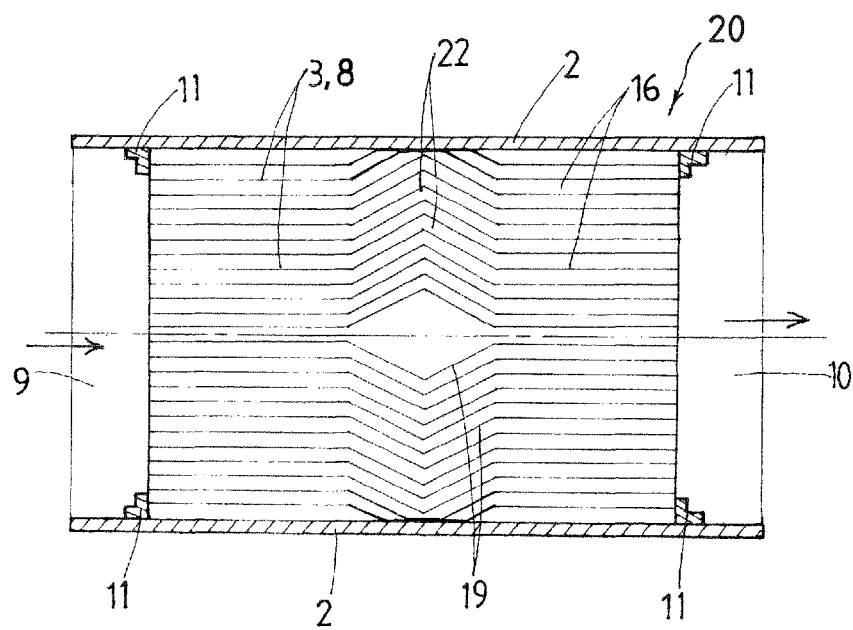
FIG. 18 is a view in axial section showing another version of the filter unit in which a canister has accommodated therein a column of wound webs that are raised above a wed surface partially in widthwise direction.

With the versions of exhaust-gas purifier shown in FIGS. 17 and 18, the web 8 is depressed below the web surface or elevated above the web surface at 19 partially in widthwise direction. Once the corrugated webs 3 of the webs 8 are wound up together into the column 4 for the filter 1, the depressed or elevated areas 19 of the different webs 8 fit into each other in interlocked relation like herringbones to keep the corrugated webs 3 against getting off each other in axial direction of the column 4. In FIG. 17, there are shown the corrugated webs 3 wound up into the column 4, each of which sinks partially at around middle in widthwise direction to form a shallow dish 19 edged with shoulders 21 and correspondingly an elevation in reverse. In FIG. 18, there is shown another version of the corrugated webs 3 wound up into the column 4, each of which is elevated partially at around middle in widthwise direction to form a wedged elevation 22 and correspondingly a depression 19 in reverse. The corrugated webs 3 modified as stated earlier can be stacked on top of each other with their elevations and depressions 19 coming into mating or interlocking with one another to keep the corrugated webs 3 against getting off each other even though the column 4 for the filter 1 experiences any axial thrust including vibration, thermal stress, external force, and so on. On production of the corrugated webs 3 with depressions and correspondingly elevations in reverse, design considerations have to be made to protect the channels 16 through which the exhaust gas is passed against collapse which might occur near boundary areas around the depressions and/or elevations at the time of winding up the corrugated webs 3 into the column 4.

Figure 19:
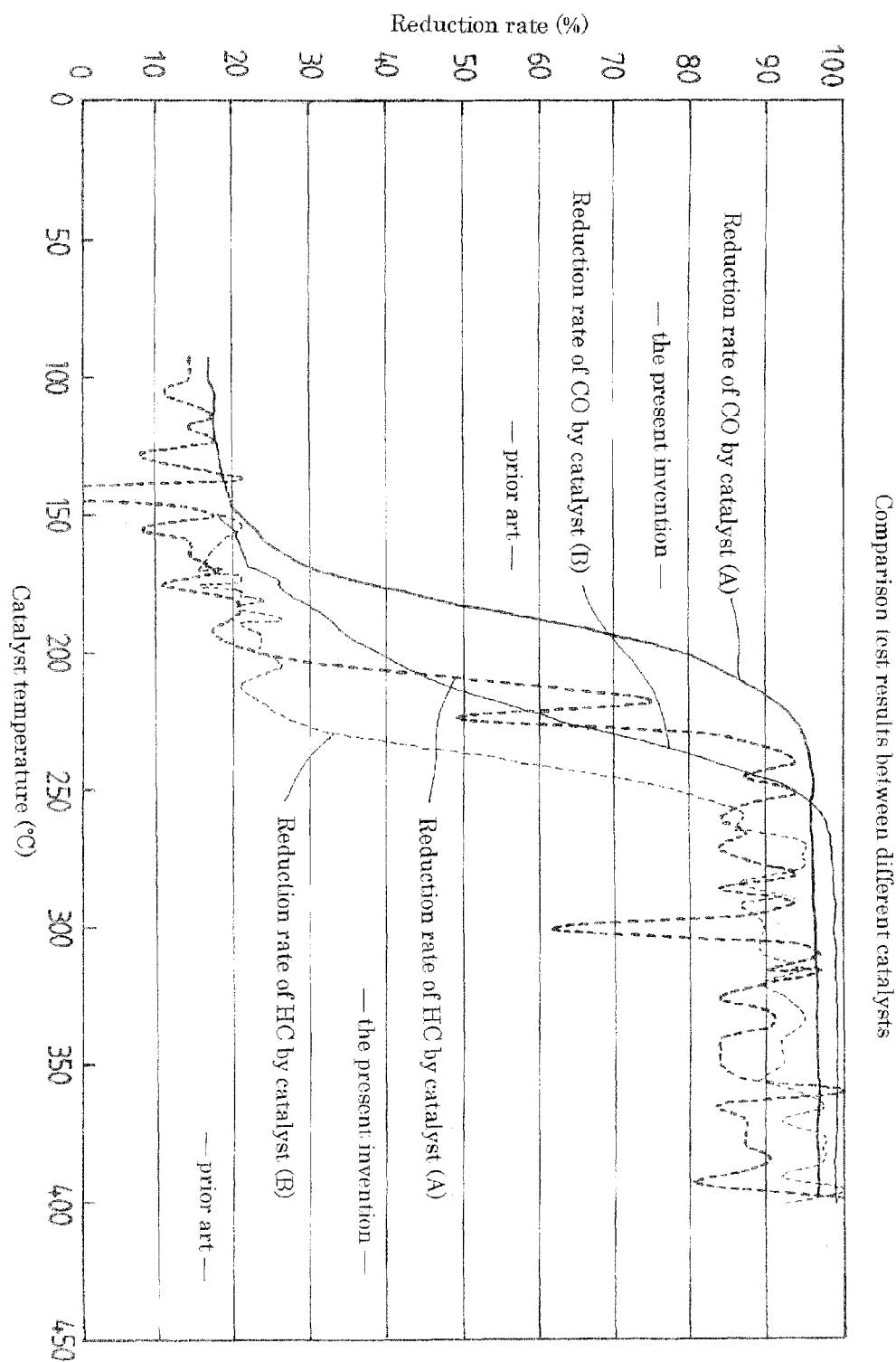
FIG. 19 is graphic representation illustrating comparison test results between a product of prior art and a product of the present invention to prove reduction rates of harmful CO and HC gasborne in the exhaust gases.

Referring to FIG. 19, there is shown comparison test results between a product of prior art and a product of the present invention to prove reduction rates of harmful CO and HC gasborne in the exhaust gas. In FIG. 19, the abscissa represents catalyst temperature °C., while the ordinate is reduction rate of harmful materials. After Observation of changes in the reduction rate % of harmful materials depending on the catalyst temperature, the product constructed according to the present invention cut back effectively the harmful materials at the exhaust-gas temperature, or catalyst temperature, of low-temperature range of from 150° C. to 250° C., whereas the reduction rate of the product of prior art was insufficient in the low-temperature range. Thus, the product of the present invention was found satisfactory in effect on elimination of harmful materials, encouraging redox reaction of harmful materials.

Figure 20:
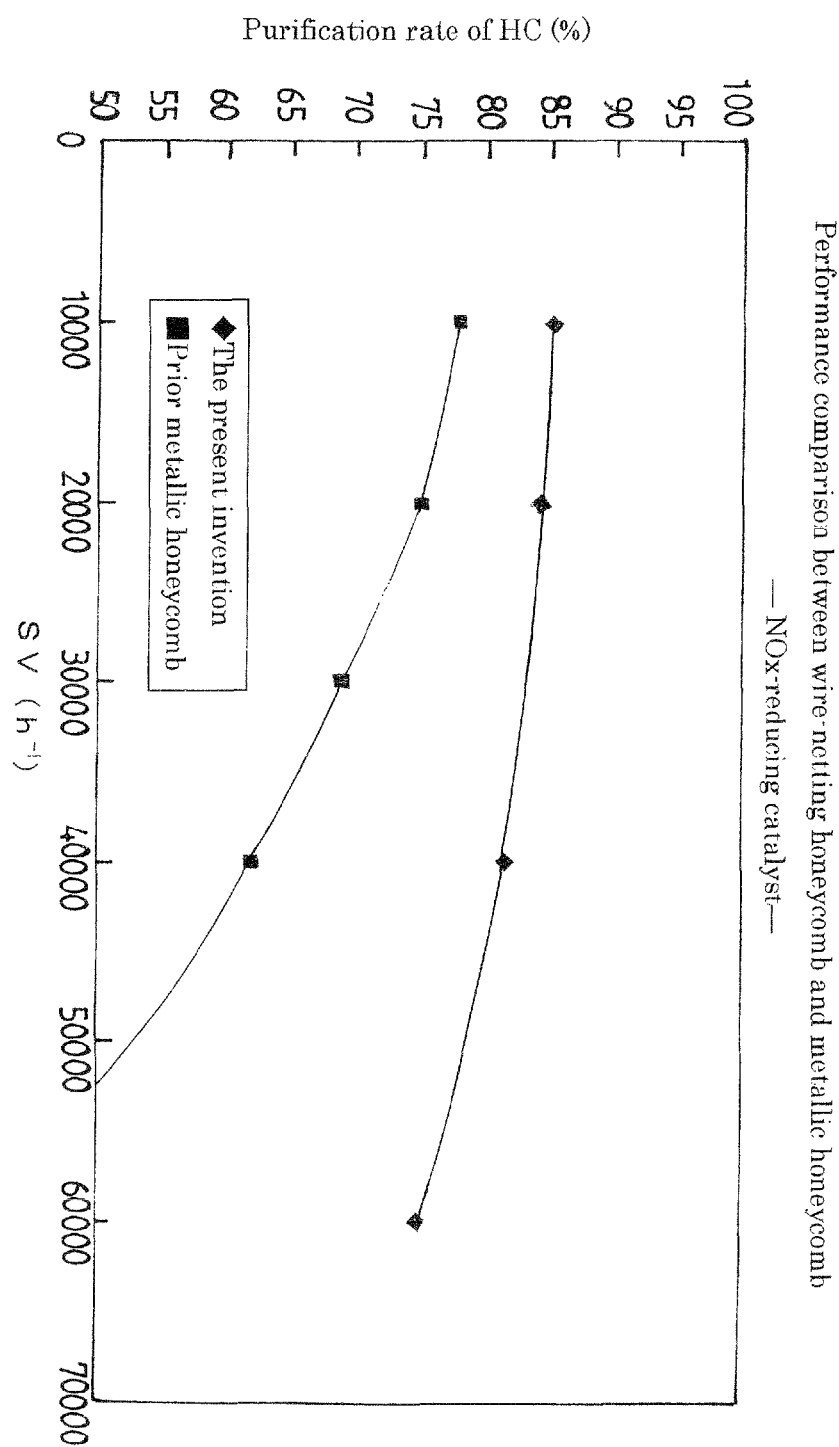
FIG. 20 is graphic representation illustrating comparison results between a product of prior art and a product of the present invention to prove purification rates of harmful HC gasborne in the exhaust gases.
Figure 21:
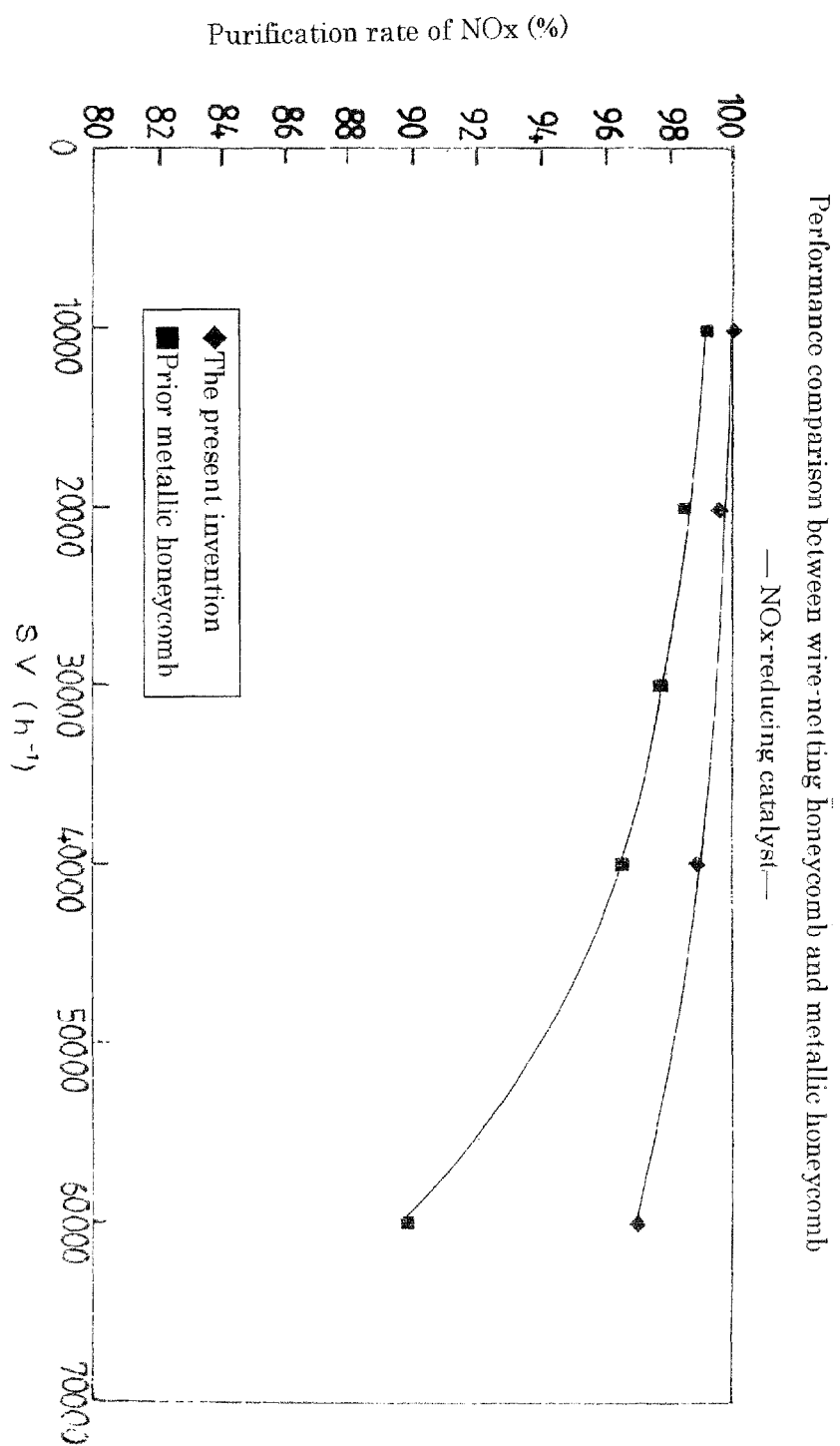
FIG. 21 is graphic representation illustrating comparison results between a product of prior art and a product of the present invention to prove purification rates of harmful NOx gasborne in the exhaust gases.

Comparison tests to verify the purification rates of harmful materials in terms of SV (1/h) between the carrier 1 constructed according to the present invention and the prior metallic honeycomb coated with platinum were carried out using a testing machine constructed as stated later with no illustration. The carrier (200 cells) of the present invention and the prior metallic honeycomb (300 cells) both coated with the NOx-reducing catalyst alike were packed within respective canisters, each of which was connected with NOx-concentration sensors at the ingress and the egress thereof. A nozzle to feed reducing fuel (gas oil) was installed at the ingress of each canister to provide an area to encourage the exhaust gases to mix with the fuel. The exhaust gases used in testing were 8000 cc in amount and 400° C. in temperature. The carriers each had a diameter of 240 mm. The fed amount of the reducing gas oil was twice the mass of the NOx emissions. FIGS. 20 and 21 show the results yielded using the testing machine constructed as stated above. In FIG. 20, there is shown graphic representation of comparison results between the carrier 1 of the present invention and the prior metallic honeycomb coated with the catalyst of platinum to prove purification rates of harmful hydrocarbons (HC) gasborne in the exhaust gas in terms of SV (1/h). The carrier 1, because of kept at high level in purification rate of HC even 60000 SV, was found not to be clogged with emissions. In contrast, the prior carrier, as observed declining, was considered clogged with emissions. Still in FIG. 21, there is shown graphic representation of comparison results between the carrier 1 of the present invention and the prior metallic honeycomb coated with the catalyst of platinum to prove purification rates of harmful NOx in terms of SV (1/h). The carrier 1, as kept at high level in purification rate of NOx even 60000 SV, was found not to be clogged with exhaust emissions, whereas the prior carrier, because of observed declining, was considered clogged with exhaust emissions.

Next, the exhaust-gas purifier of the present invention will be described in detail, which has the carrier for exhaust-gas purification constructed according to the present invention. The exhaust-gas purifier of the present invention features that the filter 20 is composed of the carrier 1 in which the wire-netting web 3 with depressed grooves 6 is wound up in a spiral manner into the stacked winds to make the zigzag channels 5 defined between the adjacent grooves 6, through which the exhaust gas G is passed between the adjacent winds. Especially, the filter 20 as shown in FIG. 5 is mainly constituted with the column 4 of the wire-netting web 3 that is corrugated to have the zigzag ridges 7 and zigzag grooves 6 alternately extending in widthwise direction and further is wound up in a spiral fashion to form stacked winds. Over the surface of the wire-netting web 3 to be made into the column 4 for the exhaust-gas purifier of the present invention is carried the oxidizing catalyst to burn off the particulate matters 8 gasborne in the exhaust gas G. With the exhaust-gas purifier of the present invention, more than one column 4 of the carrier 1, three columns 4 in FIGS. 12 to 15, 17 and 18, fits into the canister 2, which is installed in an exhaust pipe in a way either connected at forward and aft ends thereof with the exhaust pipe or fitted inside the exhaust pipe. Between any adjacent winds of the corrugated wire-netting web 3 wound up into the column 4, there are provided the channels 5 through which the exhaust gas G is passed from the ingress side to the egress side of the column 4.

Figure 22:
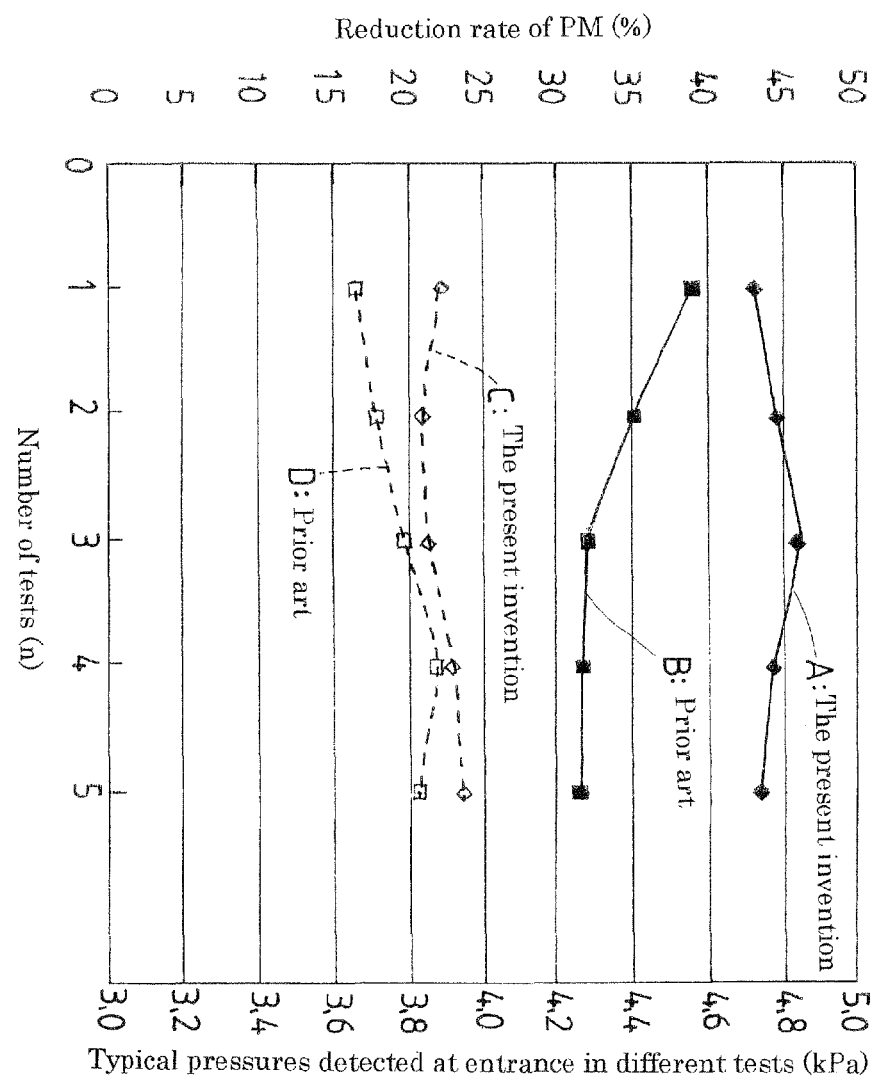
FIG. 22 is graphic representation illustrating comparison results between a product of prior art and a product of the present invention to prove reduction rates of harmful particulate matters in terms of pressures at ingresses of filters.

Comparison tests were carried out in reduction rate of PM gasborne in the exhaust gas G between the exhaust-gas purifier or the product of the present invention and the product of the prior art, which was of the metallic filter capable of regeneration by the control of exhaust temperature of the engine. The test results were given with the ETC mode for both the product of the present invention and the product of the prior art. The results in FIG. 22 are plotted with reduction rate (%) of PM as left ordinate and typical pressure (Kpa) detected at entrance in different tests as right ordinate. The numbers on the abscissa indicate number (N) of tests. The distance covered at one test was 30 km after started out. The reduction rate (%) of PM is plotted by solid lines in which a symbol A represents the product of the present invention while another symbol B is the product of the prior art. The typical pressure (Kpa) detected at entrance of the filter in different tests is plotted by dotted lines in which a symbol C represents the product of the present invention while another symbol D is the product of the prior art. As apparent from FIG. 22, the product of the present invention ensured the reduction rate (%) of PM of 45% at all times regardless of number of tests, whereas the further the number of tests was, the more the reduction rate (%) of PM in the product of the prior art declined. Moreover, it was found that the product of the present invention remained substantially unchanged in the typical pressure (Kpa) detected at entrance of the filter in different tests while the product of the prior art declined the further the number of tests was. The investigation as stated earlier found that the product of the present invention continued to burn the PM normally without clogged with the PM.

Figure 24:
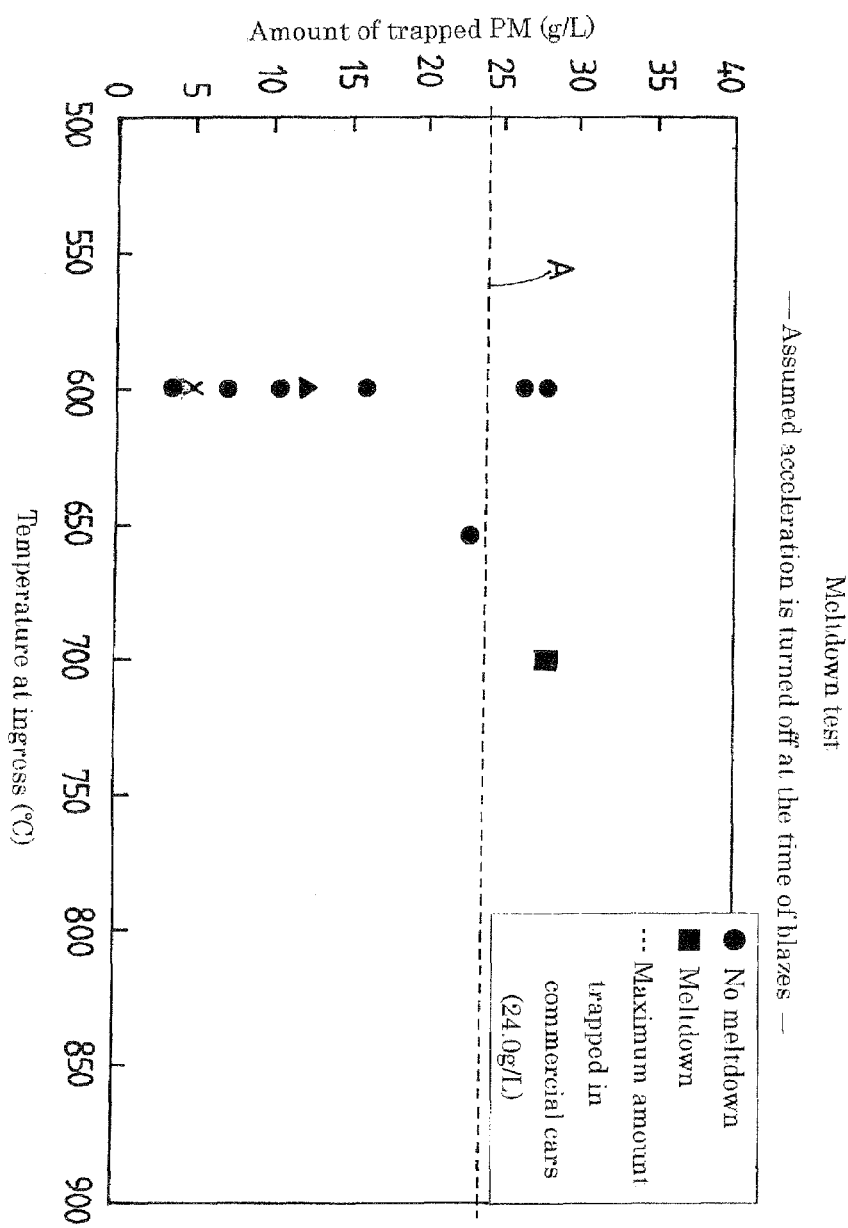
FIG. 24 is graphic representation illustrating meltdown tests for the filters used in the exhaust-gas purifier units, which are assumed to stop acceleration at the time of blazes.

FIG. 24 is a graphic representation of meltdown tests for the filters of the present invention used in the exhaust-gas purifier to prove what amount of trapped PM puts potential odds of meltdown of the filter in terms of different temperatures at the ingress of the filter, assuming acceleration is turned off at the time of blazes. The particulate matters (PM) will universally begin burning at a matter of 300° C. with the aid of catalysts. With the automobile moving at a crawl in the urban streets, however, the exhaust temperature rarely reach 300° C. and therefore the amount of PM remaining intact on the filter trend to increase. The PM accumulated on the filter during low-speed driving of the vehicle starts to burn when if the exhaust temperature rises above 300° C. after the vehicle has started running at fairly high speed. Once the PM starts burning, this blazing PM results in adding more heat to the exhaust gas to sometimes encourage the PM to burn up in no time. As an amount of heat released is naturally proportional to the amount of the PM remaining intact over the filter, the preferred carrier is needed not to melt even when greater quantity of the PM remains over the filter. Still referring FIG. 24, there is illustrated the test results to verify conditions the carrier is melted down to suffer damage. The PM trapped over the filter at low temperature was exposed abruptly to hot gas to inspect whether the filter was melted down to suffer damage. The filter 20 constituted with the carrier 1 of wire netting or metallic nonwoven fabric according to the present invention was found more than three times in durability compared with the conventional honeycomb filter of cordierite. FIG. 24 illustrates limits of the amount of trapped PM allowed the filter resisting meltdown when exposed to hot gas of 600° C. In this figure, a mark +  indicates the amount of trapped PM where the filter suffered no damage. A mark x indicates the upper limit (8 g/litter) of trapped PM where the honeycomb filter of cordierite suffered no damage. A mark Δ is the upper limit (12 g/litter) of trapped PM where the honeycomb filter of silicon carbides suffered no damage. Thus, the uppermost amount of trapped PM was found 28 g/litter. Moreover, a mark ■ is the uppermost amount (28 g/litter) of trapped PM where the product of the present invention suffered any damage with hot gas of 700° C. Still, the maximum amount of the PM accumulated on the filter in the commercial car was 25 g/litter. Investigations of the test results found that the product of the present invention, or the filter 20 of the carrier 1 of wire netting or metallic nonwoven fabric constructed according to the present invention, as hard to suffer meltdown, is extremely rich in durability.

The filtering medium is used to repeatedly suffer wide range of temperature variations, which are further different in temperature distribution in places. The carrier 1 for the filtering medium constructed with wire netting or metallic nonwoven fabric according to the present invention, because of made of very thin wires, can tolerate flexibly any deformation due to different temperature distribution with causing no local plastic deformation, thereby preventing deposits of cermics and the like over the web against exfoliation with durability.

It should be understood that the foregoing invention, and that is intended to cover all changes and modifications of the examples of the invention herein chosen for the purposes of the disclosure, which do not constitute depature from the spirit and scope of the invention.

What is claimed is:

1. A carrier construction for purification of exhaust gas comprised of a carrier coated with a catalyst to get harmful materials including particulate matters and soot disappeared with burning or oxidizing-reducing reaction to purify the exhaust gas, and a canister that fits over the carrier;

wherein the carrier is constituted with a laminate web of wire netting or a metallic nonwoven fabric wound up into a cylindrical column or stacked on top of the other into a column, the laminate web including at least a sheet of corrugated web having ridges extending parallel with an axis of the column or obliquely to the axis of the column and grooves between successive ridges to make channels through which the exhaust gas is passed from any one side to other side of the column with accompanying turbulent flow caused by a crimped surface of the web, wherein the laminate web is composed of the corrugated web overlapped on top of the other, or the corrugated web and a flat web overlapped alternately each other, wherein the ridges on the corrugated web extend zigzag with respect to the axis of the column to make zigzag channels through which the exhaust gas is passed, and wherein the ridges on the corrugated web are embossed obliquely to have a series of angles across angular range of 10°~50° with respect to the axis of the column to form the zigzag channels through which the exhaust gas is passed.

2. A carrier construction for purification of exhaust gas as set forth in claim 1, wherein the corrugated webs are overlapped on top of the other to provide the channels staggered or crossed with each other.

3. A carrier construction for purification of exhaust gas as set forth in claim 1, wherein the carrier is composed of a set of the corrugated web and the flat web or a set of more than two sheets of the corrugated webs whose ridges are identically or differently oblique to the axis of the column, the webs being wound up together into a cylindrical column or stacked on top of the other into the column.

4. A carrier construction for purification of exhaust gas as set forth in claim 1,
wherein the laminate web has depressions and elevations, and once the laminate web is wound up into the column, the depressions or elevations on the laminate web fit into each other in interlocked relation to keep the laminate web against getting off each other in a flowing direction of the exhaust gas along the axial direction of the column.

5. A carrier construction for purification of exhaust gas as set forth in claim 1, wherein the wire netting or metallic nonwoven fabric for the laminate web is constituted with wires of stainless steel or iron-aluminum-chromium alloy.

6. A carrier construction for purification of exhaust gas as set forth in claim 1, wherein the laminate webs overlapped on top of the other are joined together with brazing material or brazing foil.

7. A carrier construction for purification of exhaust gas as set forth in claim 6, wherein the carrier is brazed at any one of axially opposite ends thereof with joints of the brazing material, which are made to extend radially in the form of intermittent lines with a preselected width, or made gradually thicker in their widths as they are splayed radially outward.

8. A carrier construction for purification of exhaust gas as set forth in claim 6, wherein the brazing material or brazing foil is applied to braze at least the ridges of the corrugated web with local areas of the web expected in advance to come into brazed coalescence with the ridges, thereby getting the adjacent webs brazed together at the time the corrugated web is wound up into the column.

9. A carrier construction for purification of exhaust gas as set forth in claim 8, wherein locations of the local areas expected to make the brazed coalescence between the adjacent webs are staggered from one another every web when view in axial direction of the column.

10. A carrier construction for purification of exhaust gas as set forth in claim 1, wherein the corrugated web is embossed to have more than two groups of the zigzag ridges, each group of which is different from the other in oblique angles across angular range of 0°~50° to the axis of the column.

11. A carrier construction for purification of exhaust gas as set forth in claim 1, wherein more than one column fits into the cylindrical canister in a way that oblique angles of the ridges embossed on the corrugated webs of the columns are made either identical or different between the upstream side and downstream side of the exhaust gas.

12. A carrier construction for purification of exhaust gas as set forth in claim 1, wherein a wire for the wire-netting is 0.03 mm ~0.35 mm in diameter.

13. A carrier construction for purification of exhaust gas as set forth in claim 1, wherein the wire netting has a mesh pattern of 16~200 meshes.

14. A carrier construction for purification of exhaust gas as set forth in claim 13, wherein number of mesh in the wire netting differs between a warp and a weft in such a relation that the mesh in the warp is greater than in the weft and the number of mesh in the wire netting is 30~100 meshes in the warp while 60~200 meshes in the weft.

15. A carrier construction for purification of exhaust gas as set forth in claim 1, wherein a pitch between successive ridges is at a range from 1 mm to 6 mm.

16. A carrier construction for purification of exhaust gas as set forth in claim 1, wherein a difference between a bottom of the groove and a crest of the ridge is at a range from 0.5 mm to 5 mm.

17. A carrier construction for purification of exhaust gas as set forth in claim 1, wherein the wire woven into the web to make the carrier is coated with at least more than one ceramic material selected from the group consisting of alumina, silica, zirconia, and seria.

18. A carrier construction for purification of exhaust gas as set forth in claim 17, wherein the surface of the ceramic coating layer has carried with at least more than one reduction-oxidation catalyst selected from the group consisting of platinum, silver, potassium, palladium, iridium, iron, copper and barium.

19. A carrier construction for purification of exhaust gas as set forth in claim 1, wherein while the exhaust gas passes through the channels defined between the adjacent webs along the grooves, the harmful materials gasborne the exhaust gas flows with accompanying turbulent flow to continue coming into contact with the web, and in doing so experience oxidation-reduction reaction with the aid of the catalyst to get disappeared.

20. A carrier construction for purification of exhaust gas as set forth in claim 1,
wherein the catalyst coated over the carrier is selected from the group consisting of three-way catalyst, oxidizing catalyst and NOx-reducing catalyst that uses a reducing agent selected from the group consisting of ammonia and urea.

21. An exhaust-gas purifier comprising; a filter installed inside an exhaust passage to allow an exhaust gas passing through across the filter to get harmful materials including particulate matters, soot, NOx, HC, and so on disappeared with combustion or reducing-oxidizing reaction; wherein the filter is constituted with a carrier of a laminate web of wire netting or metallic nonwoven fabric, which is wound up cylindrically or stacked on top of the other into a column, the laminate web being composed of a corrugated web having a ridge extending straight parallel or obliquely to an axis of the column and a groove between any adjacent ridges to make a channel though which the exhaust gas passes between any overlapped webs in a way extending from any one end of axially opposite ends to the other end of the column; and wherein while the exhaust gas passes through the channel with coming into contact with crimped surface of the wire netting or metallic nonwoven fabric, the harmful materials gasborne the exhaust gas flow with accompanying turbulent flow, and in doing so are trapped on the web and/or allowed to pass across the web, experiencing combustion and/or oxidation-reduction reaction to get disappeared,
wherein the laminate web is composed of the corrugated web overlapped on top of the other, or the corrugated web and a flat web overlapped alternately each other,
wherein the ridges on the corrugated web extend zigzag with respect to the axis of the column to make zigzag channels through which the exhaust gas is passed, and
wherein the ridges on the corrugated web are embossed obliquely to have a series of angles across angular range of 10°~50° with respect to the axis of the column to form the zigzag channels through which the exhaust gas is passed.

22. An exhaust-gas purifier as set forth in claim 21, wherein the corrugated webs are overlapped on top of the other in geometry the channels defined with the ridges are staggered or crossed with each other.

23. An exhaust-gas purifier as set forth in claim 21, wherein the ridge embossed on the web is made in geometry that a length oblique with respect to the axis of the column and another length parallel with the axis of the column alternate each other so that the exhaust gas channel defined along the groove on the corrugated web is made up of a parallel channel and a zigzag channel.

24. An exhaust-gas purifier as set forth in claim 21, wherein the filter is composed of a set of the corrugated web and the flat web or a set of more than two sheets of the corrugated webs whose ridges are identically or differently oblique to the axis of the column, the webs being wound up together into a cylindrical column or stacked on top of each other into the column.

25. An exhaust-gas purifier as set forth in claim 21, wherein the laminate web has depressions and elevations, and once the laminate web is wound up into the column, the depressions or elevations on the laminate web fit into each other in interlocked relation to keep the laminate web against getting off each other in a flowing direction of the exhaust gas along the axial direction of the column.

26. An exhaust-gas purifier as set forth in claim 21, wherein the wire netting or metallic nonwoven fabric for the laminate web is constituted with wires of stainless steel or iron-aluminum-chromium alloy.

27. An exhaust-gas purifier as set forth in claim 21, wherein the laminate webs overlapped on top of the other are joined together with brazing material or brazing foil at a preselected place.

28. An exhaust-gas purifier as set forth in claim 27, wherein the filter is brazed at any one of axially opposite ends thereof with joints of the brazing material, which are made to extend radially in the form of intermittent lines with a preselected width, or made gradually thicker in their widths as they are splayed radially outward.

29. An exhaust-gas purifier as set forth in claim 27, wherein the brazing material or brazing foil is applied to braze at least the ridges of the corrugated web with local areas of the web expected in advance to come into brazed coalescence with the ridges, thereby getting the adjacent webs brazed together after the corrugated web is wound up into the column.

30. An exhaust-gas purifier as set forth in claim 29, wherein locations of the local areas expected to make the brazed coalescence between the adjacent webs are staggered from one another every web when view in axial direction of the column.

31. An exhaust-gas purifier as set forth in claim 21, wherein the corrugated web is embossed to have more than two groups of the zigzag ridges, each group of which is different from the other in oblique angles across angular range of 0°~50° to the axis of the column.

32. An exhaust-gas purifier as set forth in claim 31, wherein the filter is made up of more than one column arranged in series in the flowing direction of the exhaust gas.

33. An exhaust-gas purifier as set forth in claim 32, wherein oblique angles of the ridges embossed on the corrugated web are made smaller in an upstream side than in a downstream side of the exhaust gas.

34. An exhaust-gas purifier as set forth in claim 21, wherein a wire for the wire-netting is 0.03 mm.~0.25 mm in diameter.

35. An exhaust-gas purifier as set forth in claim 21, wherein the wire netting has a mesh pattern of 16~200 meshes.

36. An exhaust-gas purifier as set forth in claim 35, wherein number of mesh in the wire netting differs between a warp and a weft in such a relation that the mesh in the warp is greater than in the weft and the number of mesh in the wire netting is 30~100 meshes in the warp while 60~200 meshes in the weft.

37. An exhaust-gas purifier as set forth in claim 35, wherein the filter is made of the corrugated web in which at least three sheets of wire netting are laminated with each other in a relation that inward wire netting is made fine in mesh while outward wire nettings are coarse in mesh.

38. An exhaust-gas purifier as set forth in claim 35, wherein the filter is made of the corrugated web in which at least three sheets of wire netting are laminated with each other in a relation that inward wire netting is made fine in mesh with a wire thick in diameter while outward wire nettings are coarse in mesh and thin in wire diameter.

39. An exhaust-gas purifier as set forth in claim 21, wherein a pitch between successive ridges is at a range from 1 mm to 6 mm.

40. An exhaust-gas purifier as set forth in claim 39, wherein the filter is constituted with corrugated webs different in pitch between successive ridges and alternately overlapped on top of the other, and wherein the pitch in one of different webs is made larger at the upstream side of the gas flow than at the downstream side, and vice versa for another web.

41. An exhaust-gas purifier as set forth in claim 21, wherein a difference between a bottom of the groove and a crest of the ridge is at a range from 0.5 mm to 5 mm.

42. An exhaust-gas purifier as set forth in claim 21, wherein the wire woven into the web to make the carrier is coated with at least more than one ceramic material selected from the group consisting of alumina, silica, zirconia and seria.

43. An exhaust-gas purifier as set forth in claim 42, wherein the surface of the ceramic coating layer has carried with at least more than one catalyst selected from the group consisting of platinum, silver, potassium, palladium, iridium, iron, copper and barium.

44. An exhaust-gas purifier as set forth in claim 21, wherein while the exhaust gas passes through the zigzag channels defined between the adjoining webs, the particulate matters gasborne in the exhaust gas flow with coming into contact with the wire netting or metallic nonwoven fabric or remaining tentatively in the zigzag channels and in doing so experience oxidation and get burned.

45. An exhaust-gas purifier as set forth in claim 21, wherein while the exhaust gas passes through the zigzag channels defined between the adjoining webs along the grooves made on the webs, the particulate matters trapped in the zigzag channels are subjected to the oxidizing reaction over time with the aid of the catalyst deposited on the carrier to get disappeared.

46. An exhaust-gas purifier as set forth in claim 21, wherein the catalyst coated over the carrier is selected from the group consisting of of three-way catalyst, oxidizing catalyst and NOx-reducing catalyst that uses a reducing agent selected from the group consisting of and urea.

* * * * *